(12) United States Patent
Shah et al.

(10) Patent No.: US 12,227,245 B2
(45) Date of Patent: Feb. 18, 2025

(54) OBJECT-SHIFTING MECHANISM, CONTROL SYSTEM FOR OBJECT-SHIFTING MECHANISM, AND METHODS OF MANUFACTURING AND USING THE SAME

(71) Applicant: Rivian IP Holdings LLC, Plymouth, MI (US)

(72) Inventors: Parth Shaileshbhai Shah, Rancho Santa Margarita, CA (US); Francisco Javier Gutierrez Marines, Farmington Hills, MI (US); Rajinder Pal Singh, Plymouth, MI (US); Gulshan Dileep Raghani, Bloomington, IL (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/091,189

(22) Filed: Dec. 29, 2022

(65) Prior Publication Data

US 2024/0217602 A1   Jul. 4, 2024

(51) Int. Cl.
  *B62D 65/02* (2006.01)
  *B25J 13/02* (2006.01)
  *B25J 13/08* (2006.01)
  *B25J 15/00* (2006.01)
  (Continued)

(52) U.S. Cl.
  CPC ............ *B62D 65/022* (2013.01); *B25J 13/02* (2013.01); *B25J 13/088* (2013.01); *B25J 15/0052* (2013.01); *B25J 15/0608* (2013.01); *B25J 15/0616* (2013.01); *B62D 65/024* (2013.01); *B62D 65/026* (2013.01); *B62D 65/06* (2013.01)

(58) Field of Classification Search
  CPC ........ B62D 65/022; B62D 65/024–026; B62D 65/18; B62D 65/02; B62D 65/06; B25J 11/005; B25J 13/02; B25J 15/0052; B25J 15/0608; B25J 15/0616; B23P 19/10; B23P 2700/50; B60J 5/08; B60J 5/14; Y10T 29/49895
  See application file for complete search history.

(56) References Cited

U.S. PATENT DOCUMENTS

| | | |
|---|---|---|
| 3,104,910 A | 9/1963 | Kappen |
| 5,477,603 A * | 12/1995 | Kemichick ............ B62D 65/14 29/271 |
| 6,022,067 A | 2/2000 | Hargett et al. |

(Continued)

OTHER PUBLICATIONS

Non-Final Office Action dated May 17, 2023 in U.S. Appl. No. 17/217,218, 21 pages.

*Primary Examiner* — Matthew P Travers
(74) *Attorney, Agent, or Firm* — Patterson + Sheridan, LLP

(57) ABSTRACT

Object-shifting mechanisms, control systems for object-shifting mechanisms, and methods of manufacturing, assembling, and using the same. The object-shifting mechanism can include a base, a frame, at least one pickup device, at least one actuator, and a control system that is used to control operation of different components of the object-shifting mechanism and/or associated systems. In addition, methods of using a object-shifting mechanism to engage, shift, position, and release a component during an assembly and installation process are also disclosed. In addition, methods of manufacturing, configuring, and integrating object-shifting including in different manufacturing operations are also disclosed.

19 Claims, 16 Drawing Sheets

(51) Int. Cl.
*B25J 15/06* (2006.01)
*B62D 65/06* (2006.01)

(56) References Cited

U.S. PATENT DOCUMENTS

| | | | |
|---|---|---|---|
| 6,463,644 B1 * | 10/2002 | Pasque | B62D 65/026 |
| | | | 269/21 |
| 6,554,047 B1 | 4/2003 | Mondragon et al. | |
| 2002/0100155 A1 * | 8/2002 | Nakamura | B62D 65/02 |
| | | | 33/573 |
| 2002/0138962 A1 * | 10/2002 | Martin | B62D 65/02 |
| | | | 29/430 |
| 2003/0019090 A1 * | 1/2003 | Matsumoto | B62D 65/02 |
| | | | 29/428 |
| 2003/0213093 A1 | 11/2003 | Perks | |
| 2005/0177991 A1 * | 8/2005 | Cole | G02F 1/1339 |
| | | | 29/467 |
| 2009/0008043 A1 | 1/2009 | Bohmann et al. | |
| 2009/0288344 A1 | 11/2009 | Schram et al. | |
| 2013/0013108 A1 * | 1/2013 | Jacobsen | B25J 3/04 |
| | | | 700/250 |
| 2022/0314758 A1 | 10/2022 | Shah et al. | |

\* cited by examiner

OBJECT-SHIFTING MECHANISM, CONTROL SYSTEM FOR OBJECT-SHIFTING MECHANISM, AND METHODS OF MANUFACTURING AND USING THE SAME

CROSS-REFERENCE TO RELATED APPLICATIONS

This application is related by subject matter to co-pending U.S. patent application Ser. No. 17/217,218, filed on Mar. 30, 2021, and titled "Roller Door Assemblies and Methods for Attaching Roller Door Assemblies to Vehicles."

TECHNICAL FIELD

The field relates to object-shifting mechanisms.

INTRODUCTION

During manufacturing, it is often necessary to assemble components together to produce a finished product. The complexity of assembling components increases as components increase in weight. For example, components that are too heavy to be lifted by a single person can require the coordination of multiple people to be shifted into position for assembly/installation. In addition, many assembly processes, e.g., those involving vehicles, aircraft, railway cars, ships, machinery, and/or industrial equipment, among other things, require heavy objects to be shifted in a precise, agile, and controlled manner.

SUMMARY

This summary is intended to introduce a selection of concepts in a simplified form which are further described below in the detailed description section of this disclosure. This summary is not intended to identify key or essential features of the claimed subject matter, nor is it intended to be used as an aid in isolation to determine the scope of the claimed subject matter.

In brief, and at a high level, this disclosure describes, among other things, object-shifting mechanisms, control systems for object-shifting mechanisms, and methods of manufacturing and using the same, e.g., to lift, position, and assemble objects on a structure, e.g., one that is at least partially assembled. In one embodiment, an object-shifting mechanism is provided. The object-shifting mechanism can be adapted to allow for multiple degrees of motion and/or rotation. For example, in one embodiment, the object-shifting mechanism can be a multi-axis robot, e.g., one having components that are actuatable along and/or about more than one axis, e.g., an x-axis, y-axis, and/or z-axis.

In accordance with aspects herein, an object-shifting mechanism can be an assembly of components used in coordination to engage, lift, and shift objects including those heavy enough to be challenging for one or multiple people to handle. In this sense, the object-shifting mechanisms can be used for lift-assistance, transfer assistance, and/or installation and/or assembly assistance, in different instances. In one embodiment, an object-shifting mechanism includes a base, a frame, one or more pickup devices, one or more actuators or actuator assemblies, and a control system for directing operation of different parts of the object-shifting mechanism. The base can be attached to a fixed structure, e.g., a wall, ceiling, and/or structural support. The frame can be attached to the base, e.g., through a series of adjustable extensions, attachments, and/or mechanisms. The frame can also include a plurality of pickup devices that can be used to engage, lift, and release an object. The object-shifting mechanism can include multiple actuators (e.g., that together form an actuator assembly) that can be operated independently and/or in coordination to translate and/or rotate parts of the object-shifting mechanism into different positions and orientations. The control system can be attached to the object-shifting mechanism. In addition, the control system can include one control device or multiple control devices positioned at different locations on the object-shifting mechanism, e.g., for greater operational adaptability. In one embodiment, a pair of control devices are located at opposite ends of an object-shifting mechanism. This allows the object-shifting mechanism to be controlled from different positions during intricate or multi-step assembly operations, e.g., those that occur in at least partially confined spaces and/or in sequence. In some embodiments, the object-shifting mechanisms described herein can include one or more alignment features, e.g., structures, elements, protrusions, surfaces, mechanisms, sensors, detectors, or the like that can be used to align and/or position the object-shifting mechanisms more precisely, consistently, and efficiently during assembly or installation operations, in particular those performed repeatedly in sequence, e.g., on a moving assembly line. The embodiments described herein can therefore increase the efficiency, precision, and through-put of an assembly operation, among other benefits.

BRIEF DESCRIPTION OF THE DRAWINGS

The object-shifting mechanisms, control systems for object-shifting mechanisms, and methods of manufacturing and using the same discussed herein are described in detail in connection with the attached drawing figures, which illustrate non-limiting examples, in which.

Figure 12:
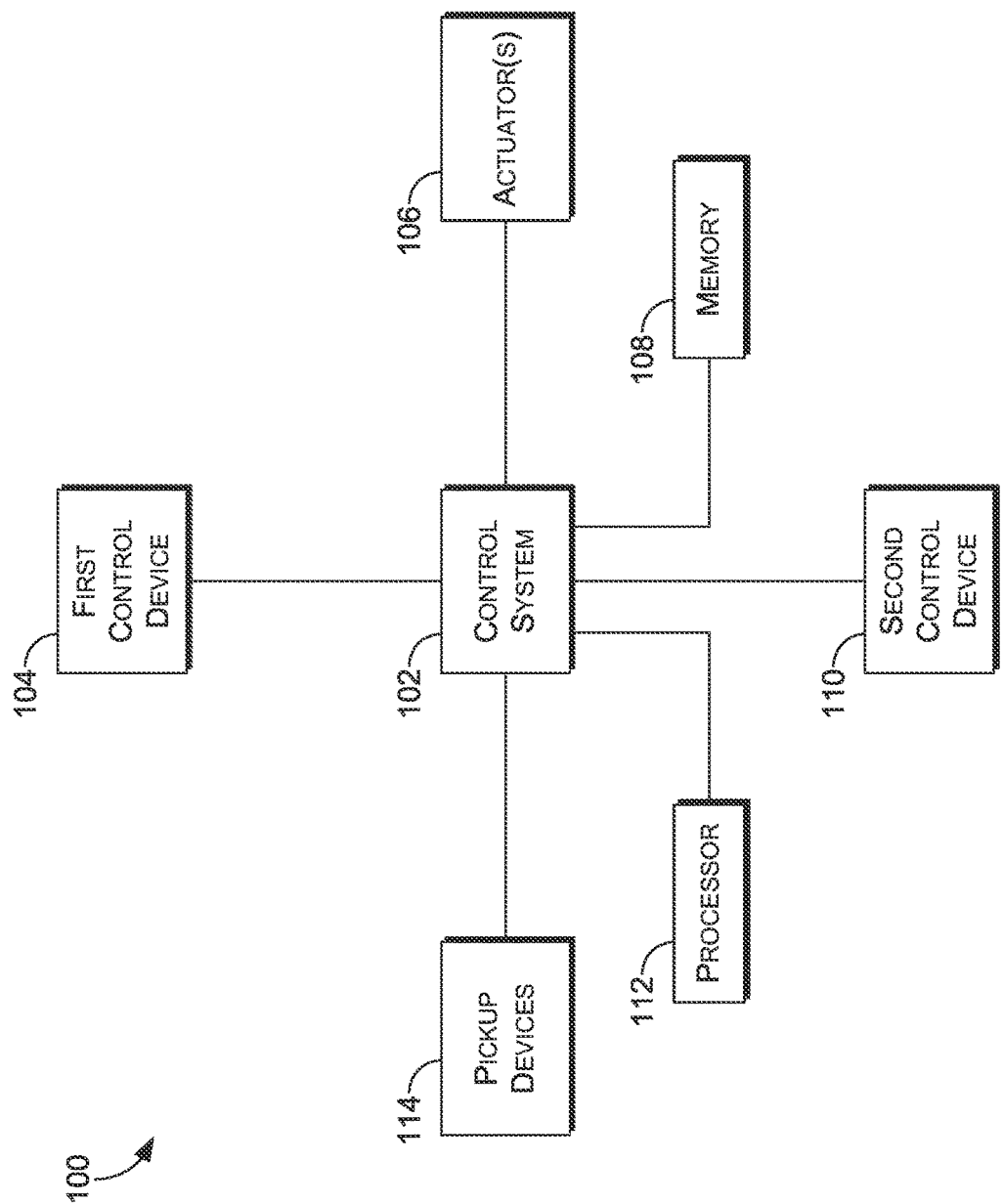
Figure 13:
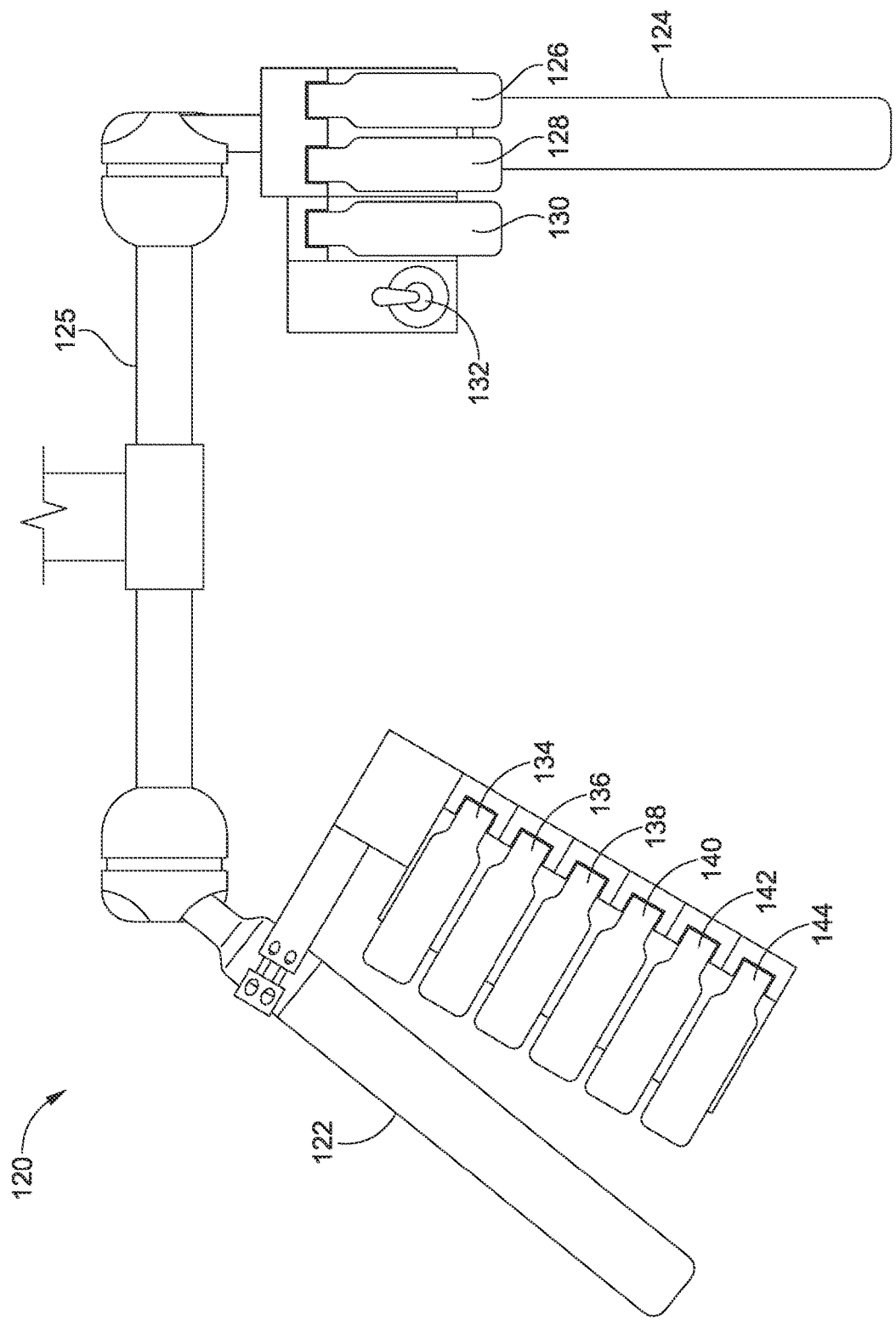
Figure 14:
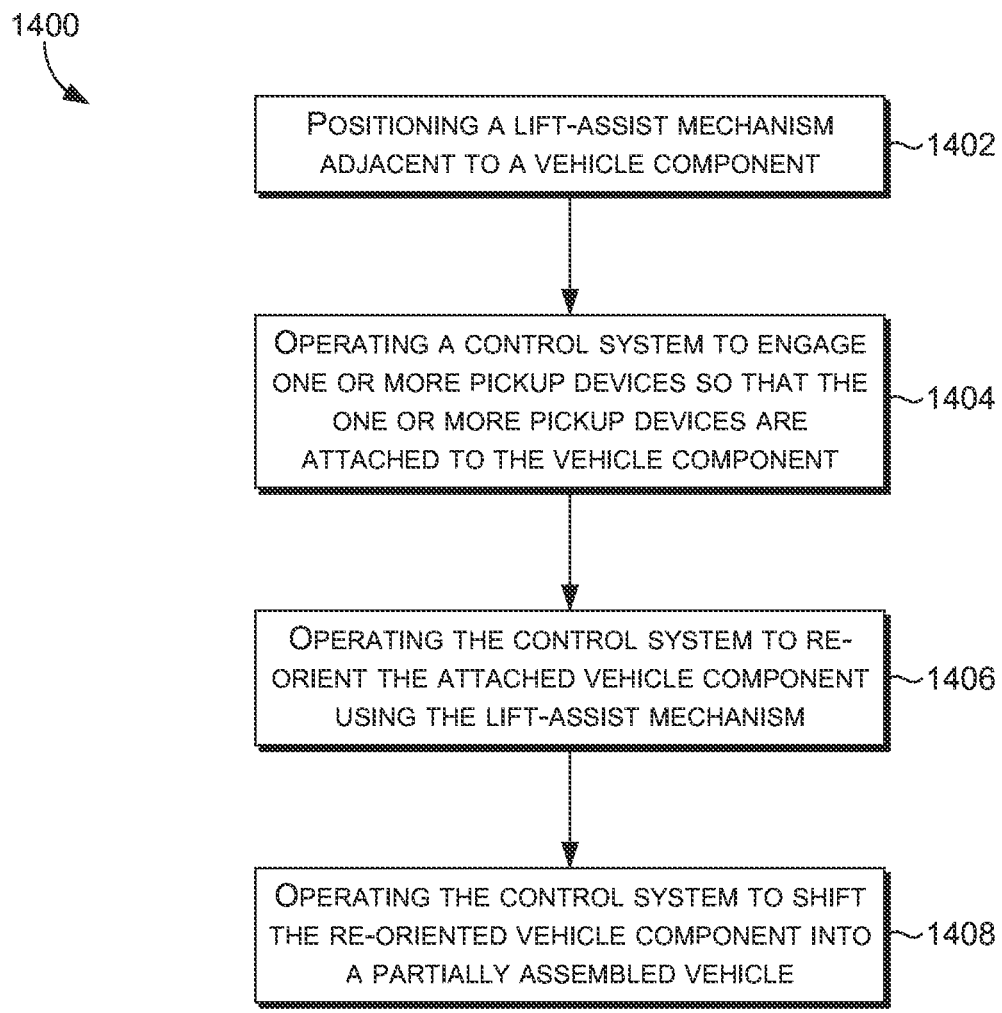
Figure 15:
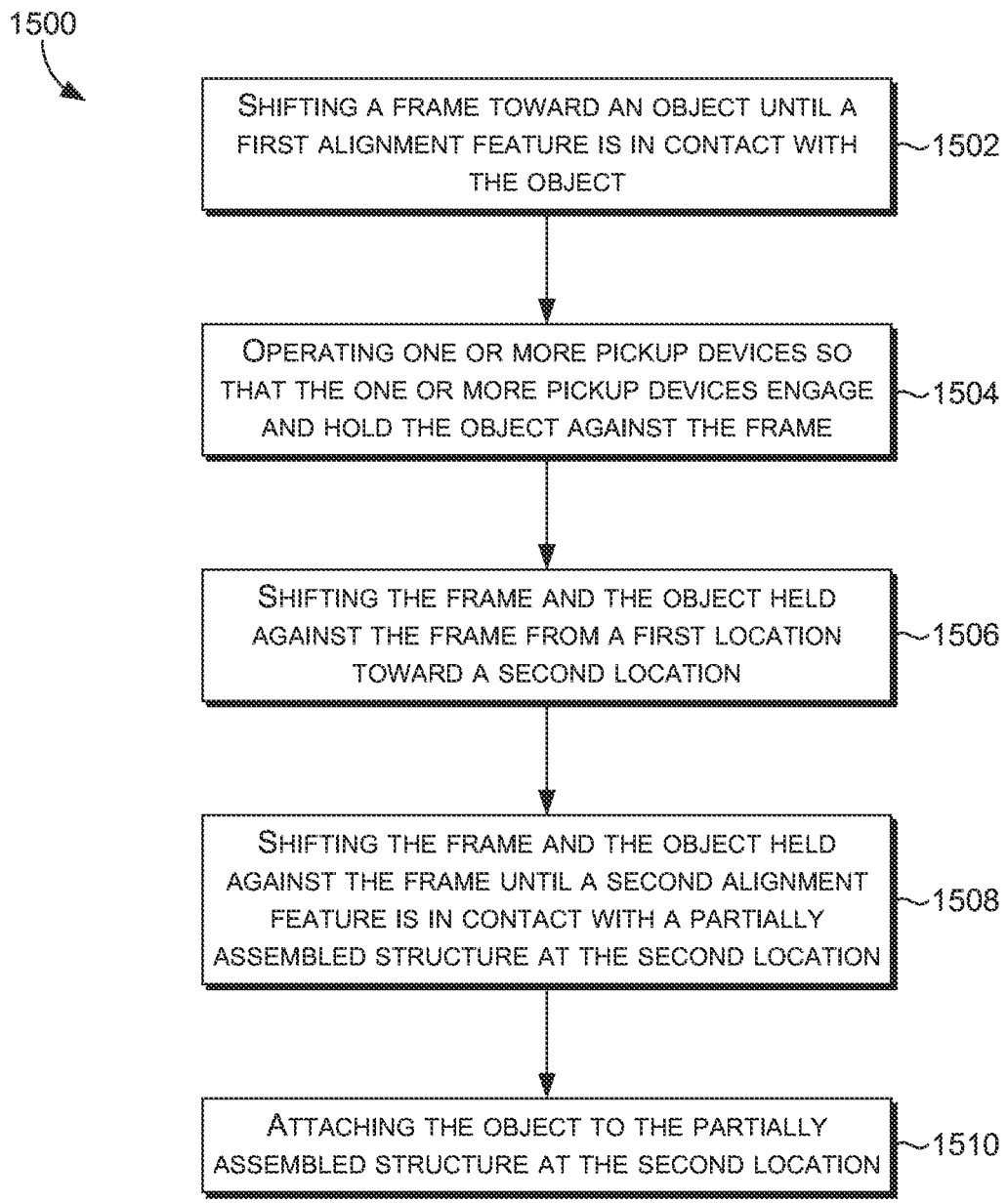
Figure 16:
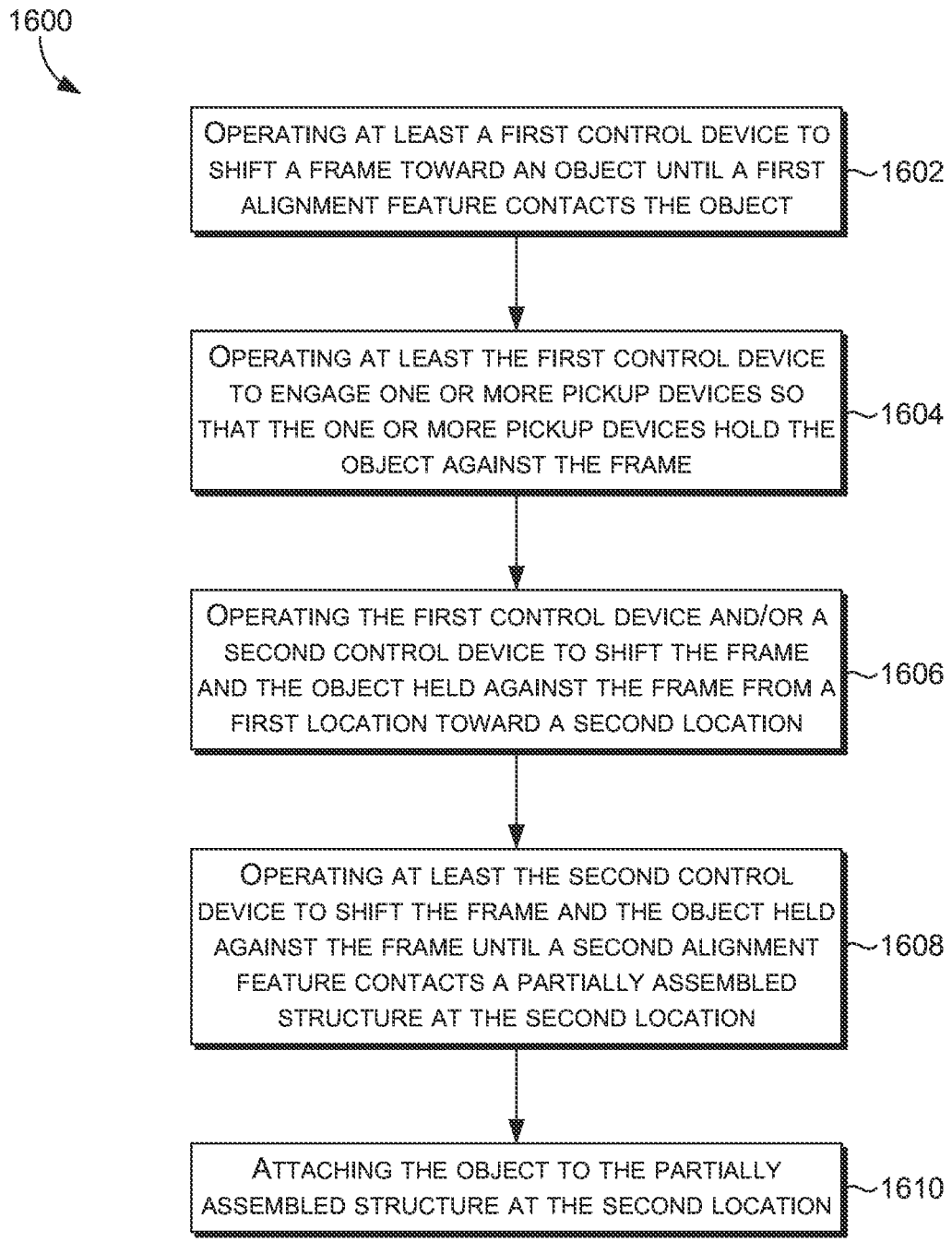

FIG. 12 depicts a generic diagram of a control system for an object-shifting mechanism, in accordance with an embodiment of the present disclosure;

FIG. 13 depicts an example control device for an object-shifting mechanism, in accordance with an embodiment of the present disclosure;

FIG. 14 depicts a block diagram of a method of using an object-shifting mechanism for installation/assembly, in accordance with an embodiment of the present disclosure;

FIG. 15 depicts a block diagram of a method of positioning objects for assembly using an object-shifting mechanism, in accordance with an embodiment of the present disclosure; and FIG. 16 depicts a block diagram of a method of positioning objects for assembly using an object-shifting mechanism, in accordance with an embodiment of the present disclosure.

DETAILED DESCRIPTION

This detailed description is provided in order to meet statutory requirements. However, this description is not intended to limit the scope of the invention. Rather, the claimed subject matter may be embodied in different ways, to include different steps, different combinations of steps, different features, and/or different combinations of features, similar to those described in this disclosure, and in conjunction with other present or future technologies and techniques. Moreover, although the terms "step" and "block" may be used herein to identify different elements of methods employed, the terms should not be interpreted as implying any particular order among or between different elements except when the order is explicitly stated.

In general, object-shifting mechanisms, control systems for object-shifting mechanisms, and methods of manufacturing and using the same are disclosed herein, among other things. The object-shifting mechanisms described herein can be used to engage, lift, shift, and hold an object in a desired position and orientation for assembly, manipulation, and/or installation, among other things. In addition, these object-shifting mechanisms can allow objects that are otherwise challenging to lift, position, and assemble manually, e.g., those being at least 50, 60, 70, 80, 90, or 100 kilograms or more, to be shifted with greater precision, agility, and efficiency, among other benefits. In addition, control systems that allow for adaptable operation of object-shifting mechanisms are also disclosed herein. In addition, methods of manufacturing, assembling, and using an object-shifting mechanism to engage, shift, position, and release a component during an assembly and installation process are also disclosed, as well as methods of configuring object-shifting mechanisms for different manufacturing and assembly operations. In addition, methods of aligning object-shifting mechanisms with different objects and structures during an assembly and/or installation process, e.g., using integrated alignment features, are also disclosed herein. The attached FIGS. 1-16 illustrate non-limiting examples of the aforementioned subject matter along with other aspect hereof.

The subject matter herein may be provided as, at least in part, a method, a system, and/or a computer program product, among other things. Thus, aspects described herein may be represented as hardware, software, or may be a combination of hardware and software, in some instances. In addition, a computer program that includes computer-useable instructions embodied on one or more computer-readable media may also be used. The subject matter herein may further be implemented as hard-coded into the mechanical design of computing components and/or may be built into an object-shifting mechanism or control system for the same as described in this disclosure.

Computer-readable media may include volatile media, non-volatile media, removable media, and non-removable media, and may also include media readable by a database, a switch, and/or various other network devices. Network switches, routers, and related components are conventional in nature, as are methods of communicating with the same, and thus, further elaboration is not provided in this disclosure. By way of example, and not limitation, computer-readable media may include computer storage media and/or non-transitory communications media.

Computer storage media, or machine-readable media, may include media implemented in any method or technology for storing information. Examples of stored information include computer-useable instructions, data structures, program modules, and/or other data representations. Computer storage media may include, but is not limited to, RAM, ROM, EEPROM, flash memory or other memory technology, CD-ROM, digital versatile discs (DVD), holographic media or other optical disc storage, magnetic cassettes, magnetic tape, magnetic disk storage, and other similar storage devices. These memory components may store data momentarily, temporarily, and/or permanently, and are not limited to the examples provided in this disclosure.

Figure 1:
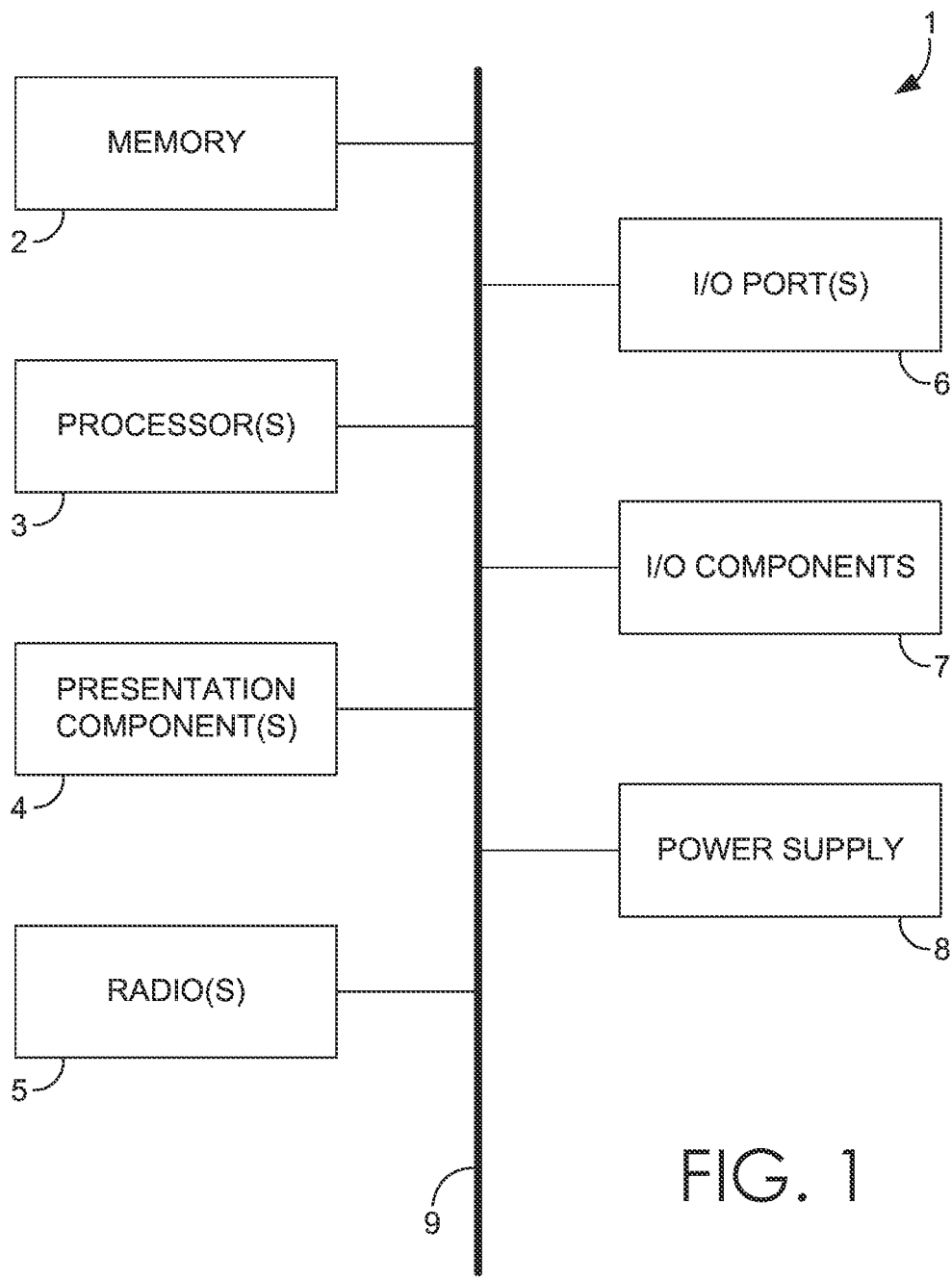
FIG. 1 depicts a selection of computing components suitable for supporting and enabling different operations and functionalities described herein, in accordance with an embodiment of the present disclosure.

Looking at FIG. 1, a block diagram of an example computing device 1 suitable for supporting, enabling, and performing different functions and operations described herein is provided, in accordance with an embodiment of the present disclosure. It should be noted that although some components depicted in FIG. 1 are shown in the singular, they may be plural, and the components may be connected in a different, including distributed, configuration. For example, computing device 1 might include multiple processors and/or multiple radios. The computing device 1 shown in FIG. 1 includes a bus 9 that may directly or indirectly connect different components together, e.g., such as memory 2, processor(s) 3, presentation component(s) 4 (if applicable), radio(s) 5, input/output (I/O) port(s) 6, input/output (I/O) component(s) 7, and/or power supply 8.

The memory 2 may take the form of the memory components described herein. Thus, further elaboration will not be provided here, but memory 2 may include any type of tangible medium that is capable of storing information, such as a database. A database may include any collection of records, data, and/or other information. In one embodiment, memory 2 may include a set of computer-executable instructions that, when executed, facilitate various functions or steps associated with the subject matter described herein. These instructions will be referred to as "instructions" or an "application" in short. The processor 3 may actually be multiple processors that may receive instructions and process them accordingly. The presentation component 4 may include a display, a speaker, a screen, a portable digital device, and/or other components that can present information through visual, auditory, and/or other tactile cues (e.g., a display, a screen, a lamp, a light-emitting diode (LED), a graphical user interface (GUI), and/or a lighted keyboard).

The radio 5 may facilitate communication with a network, and may additionally or alternatively facilitate other types of wireless communications, such as Wi-Fi, WiMAX, LTE, Bluetooth, and/or VoIP communications, among other possible communication protocols. In various aspects, the radio 5 may be configured to support multiple technologies, and/or multiple radios may be configured and utilized to support multiple technologies in the embodiments described herein.

The input/output (I/O) ports 6 may take a variety of forms. Example I/O ports may include a Universal Serial Bus ("USB") jack, a stereo jack, an infrared port, and/or other standardized or proprietary communications ports. The input/output (I/O) components 7 may include one or more keyboards, microphones, speakers, touchscreens, and/or any other item useable to directly or indirectly input data into the computing device 1. The power supply 8 may comprise batteries, generators, fuel cells, an electrical supply source, and/or any other component that may act as a power source to supply power to computing device 1 and to any other components described herein.

Figure 2:
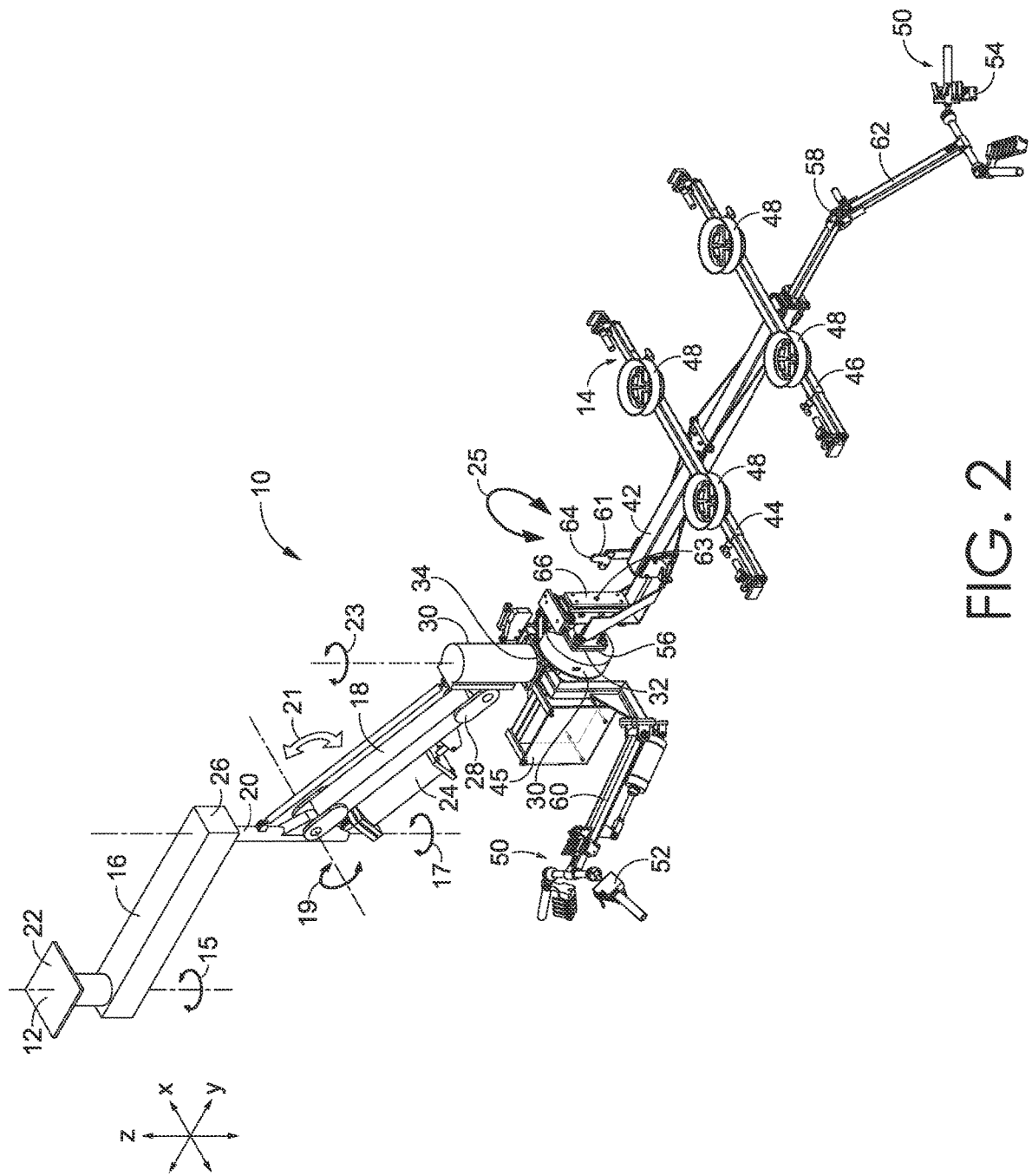
FIGS. 2-4 depict an object-shifting mechanism from different perspectives, in accordance with an embodiment of the present disclosure.
Figure 3:
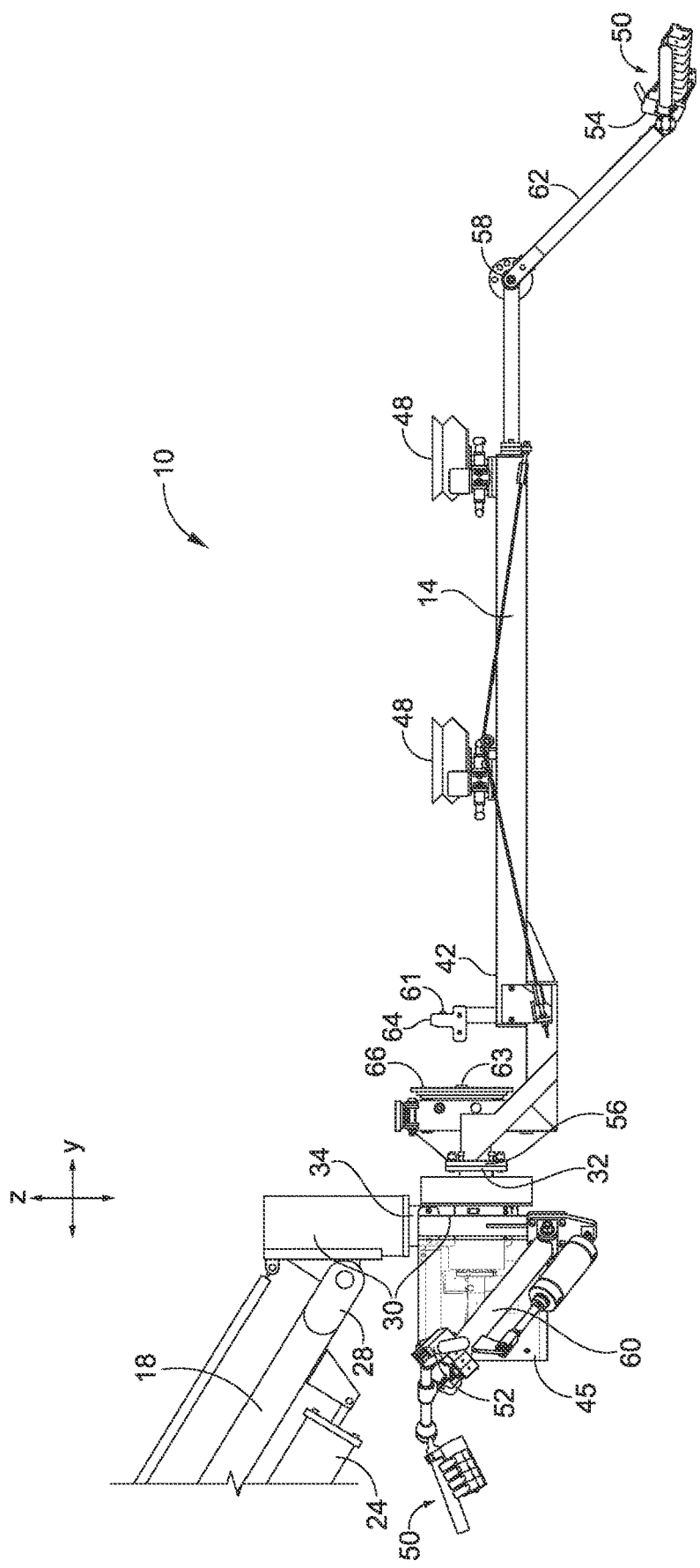
Figure 4:
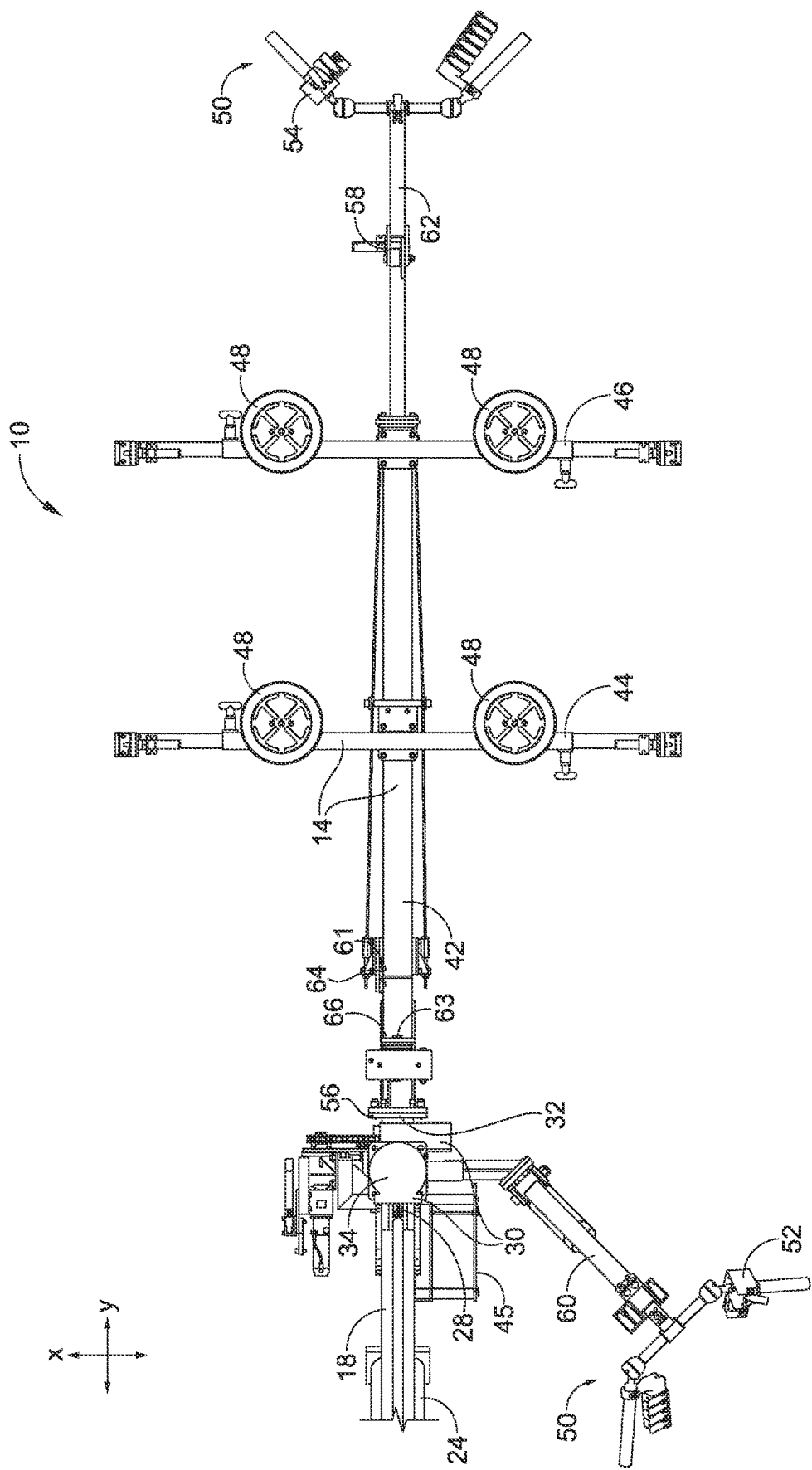

Looking now at FIGS. 2-4, an object-shifting mechanism 10 is shown, in accordance with an embodiment of the present disclosure. The object-shifting mechanism 10 can be used for lift-assistance, transfer-assistance, assembly-assistance, installation-assistance, or other purposes. The object-shifting mechanism 10 is intended to represent one possible configuration among many possible configurations contemplated herein.

FIG. 1 depicts a perspective view of the object-shifting mechanism 10. FIG. 2 depicts a side-elevation view of the object-shifting mechanism 10. FIG. 3 depicts a top-down plan view of the object-shifting mechanism 10. FIGS. 2-4 show the object-shifting mechanism 10 generally in isolation. However, it will be seen that in additional depictions, additional supporting features may be included with the object-shifting mechanism 10, e.g., features that support movement, powering, stability, and control. The isolated depictions in FIGS. 2-4 are provided for clarity, simplicity, and explanation purposes.

Looking at FIG. 2, the object-shifting mechanism 10 includes a base 12 that is attached to a frame 14. In particular, the frame 14 is connected to the base 12 through an assembly of movable components, e.g., extensions, pivot-assemblies, attachments, and the like, as shown in FIG. 2. For example, the object-shifting mechanism 10 includes a pivoting-extension 16. The pivoting-extension 16 is attached to the base 12, such that the pivoting-extension 16 can rotate on the base 12, e.g., about the z-axis as identified in FIG. 1. This rotation is also indicated by arrow 15. The rotation of the pivoting-extension 16 can be imparted by a rotational actuator, e.g., one that is electrically-powered. The rotational actuator can be attached to the base 12 and/or to the pivoting-extension 16, e.g., in one instance, being attached at a location 22 shown in FIG. 2. The base 12 therefore provides a first point of rotation/motion for the object-shifting mechanism 10.

The object-shifting mechanism 10 also includes a pivoting-extension 18. The pivoting-extension 18 is movably coupled to the pivoting-extension 16. In particular, the pivoting-extension 16 and the pivoting-extension 18 are connected through a support 20 that generally extends between the pivoting-extensions 16, 18. The support 20 is attached adjacent to a distal end 26 of the pivoting-extension 16. This attachment configuration between the pivoting-extensions 16, 18 allows the pivoting-extension 18 to rotate/pivot about multiple axes at the distal end 26. For example, by rotating the support 20 (e.g., using an actuator), the pivoting-extension 18 can be rotated/pivoted about the z-axis as identified in FIG. 2, and as shown by arrow 17. In addition, by rotating/pivoting the pivoting-extension 18 on the support 20 (e.g., using an actuator) as shown by arrow 19, the pivoting-extension 18 can be rotated to different positions about the x-axis as identified in FIG. 2, and as shown by arrow 21. This imparted rotation about the x-axis as identified in FIG. 2 can be used to translate the frame 14 between a lowered position and a raised position, e.g., that may be suitable for different points in an assembly, installation, and/or manufacturing process.

The rotation of the pivoting-extension 18 about the z-axis and/or about the x-axis as indicated in FIG. 2 can be imparted by one or more corresponding actuators, e.g., actuators attached to the support 20 and/or to the pivoting-extensions 16, 18. For example, a rotational actuator attached adjacent to the distal end 26 of the pivoting-extension 16 can be operated to rotate the pivoting-extension 18 about the z-axis as indicated by the arrow 17. In addition, a linear actuator 24 attached between the support 20 and a distal end 28 of the pivoting-extension 18 can be operated to rotate/pivot the pivoting-extension 18 on the support 20. In other words, extending the linear actuator 24 rotates the pivoting-extension 18 in one direction, e.g., raising it, and retracting the linear actuator 24 rotates the pivoting-extension 18 in another direction, e.g., lowering it. The linear actuator 24 can be powered electrically, hydraulically, pneumatically, or through any combination of the same in different aspects. The multi-axis movement and/or rotation of the pivoting-extension 18 on the object-shifting mechanism 10 can allow the frame 14 to be positioned in a more agile, precise, and adaptable manner during assembly, installation, and manufacturing processes, among other benefits.

Looking still at FIGS. 2-4, it can be seen that the pivoting-extension 18 is movably coupled to a pivot-connection 30. The pivot-connection 30 forms an assembly that also allows for multi-axis rotation/movement of the frame 14. In particular, the pivot-connection 30 allows the frame 14 to rotate (e.g., through operation of a rotational actuator) about the z-axis, as identified in FIG. 2, and as indicated by arrow 23, and also allows the frame 14 to rotate (e.g., through operation of a rotational actuator) about the y-axis as shown in FIG. 2, and as indicated by arrow 25. To enable this dual rotation, the pivot-connection 30 includes a pivot-point 32 and a pivot-point 34. The pivot-point 32 allows the frame 14 to rotate about the y-axis as shown in FIG. 2, and as indicated by the arrow 25. The pivot-point 34 allows the frame 14 to rotate about the z-axis as shown in FIG. 2, and as indicated by the arrow 23. Thus, with this configuration, the pivot-connection 30 can support multiple degrees of rotational motion.

Looking still primarily at FIG. 2, the frame 14 includes a plurality of elongated-extensions 42, 44, 46. The elongated-extensions 44, 46 are mounted substantially perpendicular to the elongated-extension 42. In addition, the frame 14 includes a plurality of pickup devices 48 that are mounted in a distributed configuration. The pickup devices 48 are components that can be controlled, e.g., activated/engaged or deactivated/disengaged, e.g., at the direction of control components, to either hold or release objects. In different embodiments, the pickup devices 48 can be suction cups, electromagnets, vacuum-suction heads, hooks, claws, clasping-mechanisms or grasping-mechanisms or gripping mechanisms, electrostatic-grippers, or other components that are operable to engage, e.g., hold, and disengage, e.g., release, objects as described above. In addition, in different embodiments, the pickup devices 48 can be pneumatically-powered (e.g., being connected to one or more sources of vacuum), electrically-powered (e.g., being connected to one or more batteries, generators, or other sources of electrical current), and/or mechanically powered (e.g., being connected to one or more mechanical actuators). The type of pickup device 48 used on the frame 14 can be changed based on the structure, material, and/or weight of an object being lifted, transferred, and released. For example, pneumatically-driven suction cups can be used for objects having substantially flat surfaces that permit a negative pressure to be at least partially maintained in the suction cups. Or, electromagnets can be used for objects formed of magnetic materials such as metal. Or, grabbing-mechanisms can be used with objects having geometries that are suitable for being mechanically grasped and then released.

Looking still primarily at FIG. 2, the object-shifting mechanism 10 includes a control system 50 at least a portion of which is identified in FIG. 2. The control system 50 includes a control device 52 and a control device 54. The control devices 52, 54 can be communicatively interconnected to computing components and/or to communication components, and can be used to direct operation of the object-shifting mechanism 10 and components thereof. The control device 52 is positioned generally adjacent to one end 56 of the frame 14. The control device 54 is positioned generally adjacent to another end 58 of the frame 14. In some aspects, the control devices 52, 54 can be used to control operation of the actuators that shift/rotate/operate different structures of the object-shifting mechanism 10, e.g., the structures 14, 16, 18, 30, 48, and/or others. In embodiments, the object-shifting mechanism 10 can include additional features that support different assembly, installation, and manufacturing operations. For example, the object-shifting mechanism 10 can include one or more brakes, locking-mechanisms (e.g., that restrict movement or functionality of different parts of the object-shifting mechanism 10), lights, cameras, sensors, displays, indicators, communication components, speakers, input devices, or other components. These components, if incorporated, can also be directed by the control system 50 and control devices 52, 54 thereof.

The use of multiple distributed control devices, e.g., the control devices 52, 54 or others, positioned locally and/or remotely relative to the object-shifting mechanism 10, allows the position of the frame 14 to be controlled more easily during complex assembly, installation, and/or manufacturing processes. For example, when installing components in confined spaces, an operator can shift to a control device 52 or 54 that is easier to use, e.g., one that is more easily accessible, and that provides the same or similar functionality as the other control device 52 or 54. To support further adaptability, the control device 52 is attached to the frame 14 through a movable-extension 60 (e.g., an adjustable piston or cylinder), and the control device 54 is attached to the frame 14 through a movable-extension 62 (e.g., an adjustable piston or cylinder).

The movable-extensions 60, 62 allow the control devices 52, 54 to be shifted to different positions relative to the frame 14. This facilitates more adaptable use under different circumstances, e.g., during operations where the frame 14 is shifted, pivoted, or otherwise positioned such that one control device 52 or 54 is more difficult to access. Example configurations and operability of the control system 50 is discussed further in connection with FIGS. 12 and 13. The object-shifting mechanism 10 also includes a barrier 45 located between the control device 52 and the actuator components adjacent to the pivot-connection 30. The barrier 45 can be formed of metal, metal alloy, polymers, polymer composites, and/or in one instance, can be at least partially transparent or translucent (e.g., being formed of a substantially transparent polymer material, such as polymethyl methacrylate). The transparent or translucent material can allow an operator at the control device 52 to more easily monitor other components of the object-shifting mechanism 10.

Looking still at FIGS. 2-4, the object-shifting mechanism 10 includes a non-limiting selection of alignment features, e.g., in this instance, a locating-structure 64 and a positioning-bracket 66. In different embodiments, the object-shifting mechanisms described herein can include one or more of such alignment features. These alignment, or relative positioning, features can be physical structures, e.g., extensions, protrusions, surfaces, brackets, assemblies, and the like, and/or can be mechanisms, e.g., those having shiftable components, e.g., that shift upon contacting an object at a correct or desired location, and/or can be sensors, e.g., contact or proximity sensors, e.g., that send a signal based on an object being in contact or within a particular proximity. The alignment features can be mounted on the object-shifting mechanism so that when the object-shifting mechanism is shifted into a particular position, e.g., a position associated with engaging and lifting an object, e.g., such as a manufacturing component, or a position associated with attaching, mounting, and/or installing an object, e.g., on a partially assembled structure, the alignment features can indicate that a correct position is reached. Thus, the use of such structures can allow for faster and more precise shifting of objects, e.g., by requiring fewer alignment attempts or re-alignments, and more efficient shifting of objects, e.g., by allowing more objects to be shifted in a shorter period of time.

The locating-structure 64 is positioned on the frame 14 and the positioning-bracket 66 is positioned adjacent to the frame 14, e.g., being attached to a pivot-connection located by an end of the frame 14. The locating-structure 64 and the positioning-bracket 66 can each be used to facilitate substantially consistent alignment during a manufacturing, installation, and/or assembly process. For example, the locating-structure 64 can have a size, shape, and position on the frame 14 that enables substantially consistent alignment with objects being picked up, transferred, and installed. The locating-structure 64 in FIG. 2 is positioned so that it extends away from the frame 14, e.g., orthogonal to a plane defined generally by the frame 14 and/or by the pickup devices 48. In addition, the positioning-bracket 66 enables substantially consistent alignment between the object-shifting mechanism 10 and assemblies where objects are installed or attached. This can allow operators to maintain substantially consistent positioning during different operations performed by the object-shifting mechanism 10 and thus can increase the precision, speed, and efficiency of such operations.

In one embodiment, the locating-structure 64 and the positioning-bracket 66 may each include a corresponding sensor 61, 63. The sensors 61, 63 can be positioned to detect and indicate engagement with an object, surface, or assembly. In one embodiment, the sensors 61, 63 can be contact sensors, e.g., those that provide feedback to a control system indicating when the sensors, and by association the corresponding alignment features, are in contact with an object, surface, or assembly, thus indicating that a desired position has been reached. In another embodiment, the sensors 61, 63 can be proximity sensors, e.g., that detect proximity to an object, surface, or assembly. Using the sensors 61, 63 can further help facilitate consistent positioning, and the feedback from the sensors 61, 63 can help limit excess force applied to an object, surface, or assembly by an object-shifting mechanism 10, e.g., during an assembly process controlled by one or more operators. In different aspects, a sensor may be used on some locating features, all locating features, or no locating features. The sensors, e.g., 61, 63 shown in FIG. 2, can be connected to a computing device, e.g., one associated with a control system that directs operation of the object-shifting mechanism and/or provides feedback to an operator of an object-shifting mechanism.

Figure 5:
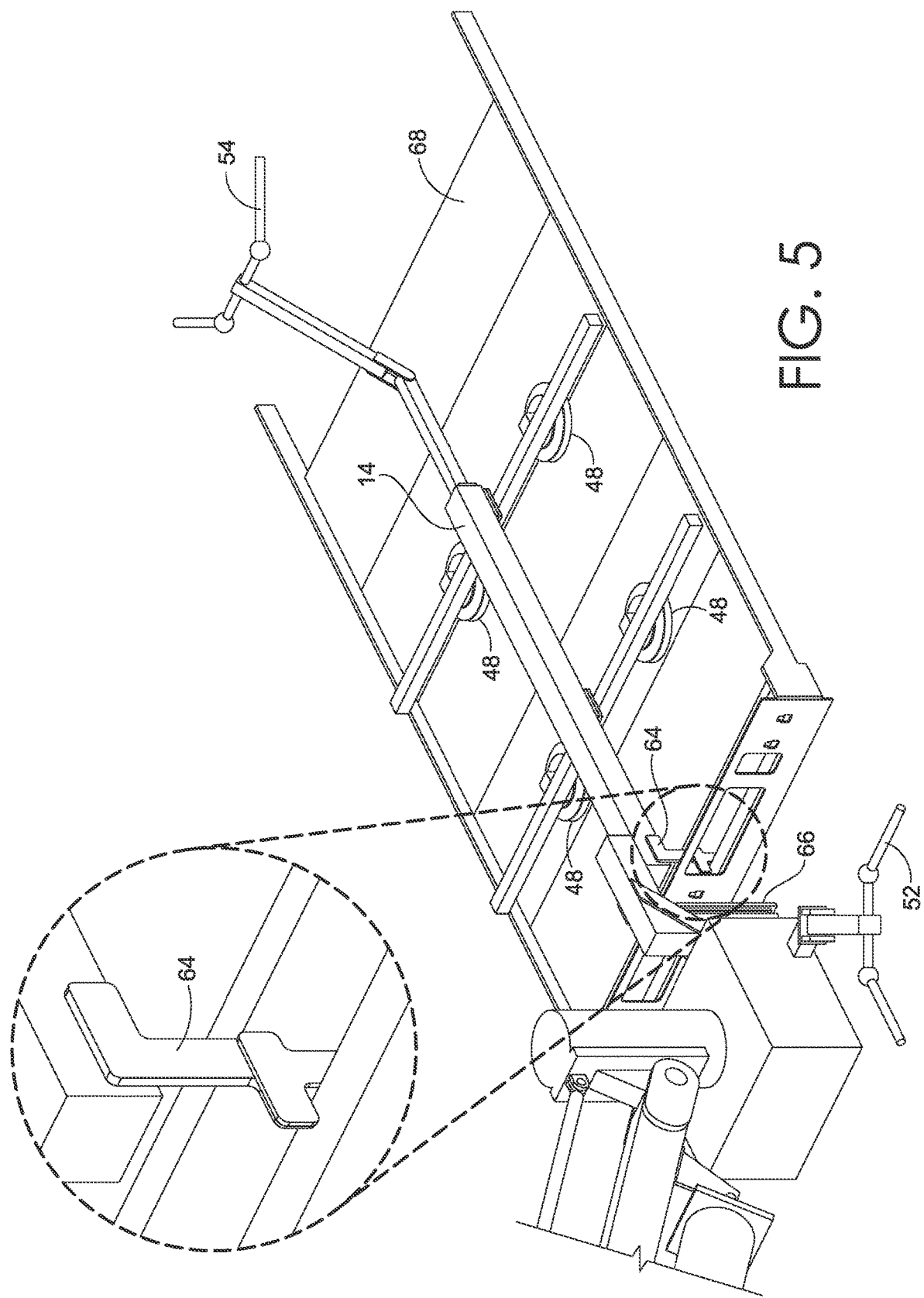
FIG. 5 depicts the object-shifting mechanism shown in FIGS. 2-4 being used to lift a component, e.g., a vehicle component, in accordance with an embodiment of the present disclosure.

Looking at FIG. 5, the object-shifting mechanism 10 is shown engaging and lifting a component 68, e.g., in this instance being a roller-door assembly, e.g., that forms part of a truck or other commercial vehicle, in accordance with an embodiment of the present disclosure. FIG. 5 shows how the locating-structure 64 is attached to the frame 14 and extends generally in a direction of the component 68, such that it can be positioned against a boundary of the component 68. To illustrate one example, during a process of engaging the component 68, the object-shifting mechanism 10 can be shifted thereby shifting the locating-structure 64 until it is in contact with the boundary of the component 68 as shown in FIG. 5. This use of the locating-structure 64 can help facilitate substantially consistent alignment and positioning of the frame 14 and the component 68. This substantially consistent alignment facilitates substantially consistent or known positioning of the component 68 during subsequent transfer, positioning, and installation/assembly.

The locating-structure 64 and/or the positioning-bracket 66 (discussed in connection with FIG. 9) may include materials and/or surface-coatings that help limit, reduce, and/or inhibit damage to structures that are contacted, e.g., such as the component 68 shown in FIG. 5. For example, the locating-structure 64 can include material(s) that is/are substantially softer than material(s) forming the object or component being shifted, such that marring, scratching, scuffing, deformation, and/or other contact-based damage on such objects is limited, reduced, and/or inhibited. For example, a material associated with the locating-structure 64 and/or the positioning-bracket 66 may have a Rockwell Hardness ("HRA") that is less than a HRA of a material of the object that is being shifted. This HRA can be determined for such materials using testing methods ASTM E-18 or ASTM D2240. In embodiments, a material or coating of the locating-structure 64 and/or the positioning-bracket 66 can be a first material (e.g., plastic, rubber, and/or textiles or other materials of similar hardness) and a material or coating of the object can be a second material (e.g., metal and/or metal alloy), the second material having a higher HRA than the first material. This material selection can limit, reduce, and/or inhibit contact-based damage, and additionally can allow for more direct engagement between a object-shifting mechanism and an object, e.g., with less concern for damage. The same is true for the positioning-bracket 66 of the object-shifting mechanism 10.

Looking now at FIGS. 6-11, an example process of installing a component 68 on an assembly line 55 is shown, in accordance with an embodiment of the present disclosure. In particular, FIGS. 6-11 depict the object-shifting mechanism 10 engaging, positioning, and holding the component 68 for installation/assembly in a vehicle located on the assembly line 55. FIGS. 6-11 depict the object-shifting mechanism 10 shown in FIGS. 2-4 being used. However, in different embodiments, other mechanisms described herein can also be used. In FIGS. 6-11, the component 68 that is being installed is a roller-door assembly for a van, truck, or other commercial-type vehicle 65. However, in other embodiments, the object-shifting mechanisms described herein can be used for shifting components associated with other installation, assembly, and manufacturing processes, e.g., those related to ships, aircraft, railway transports, or other industrial, commercial, or manufactured equipment. The installation process shown in FIGS. 6-11 is intended to represent one non-limiting example.

Figure 6:
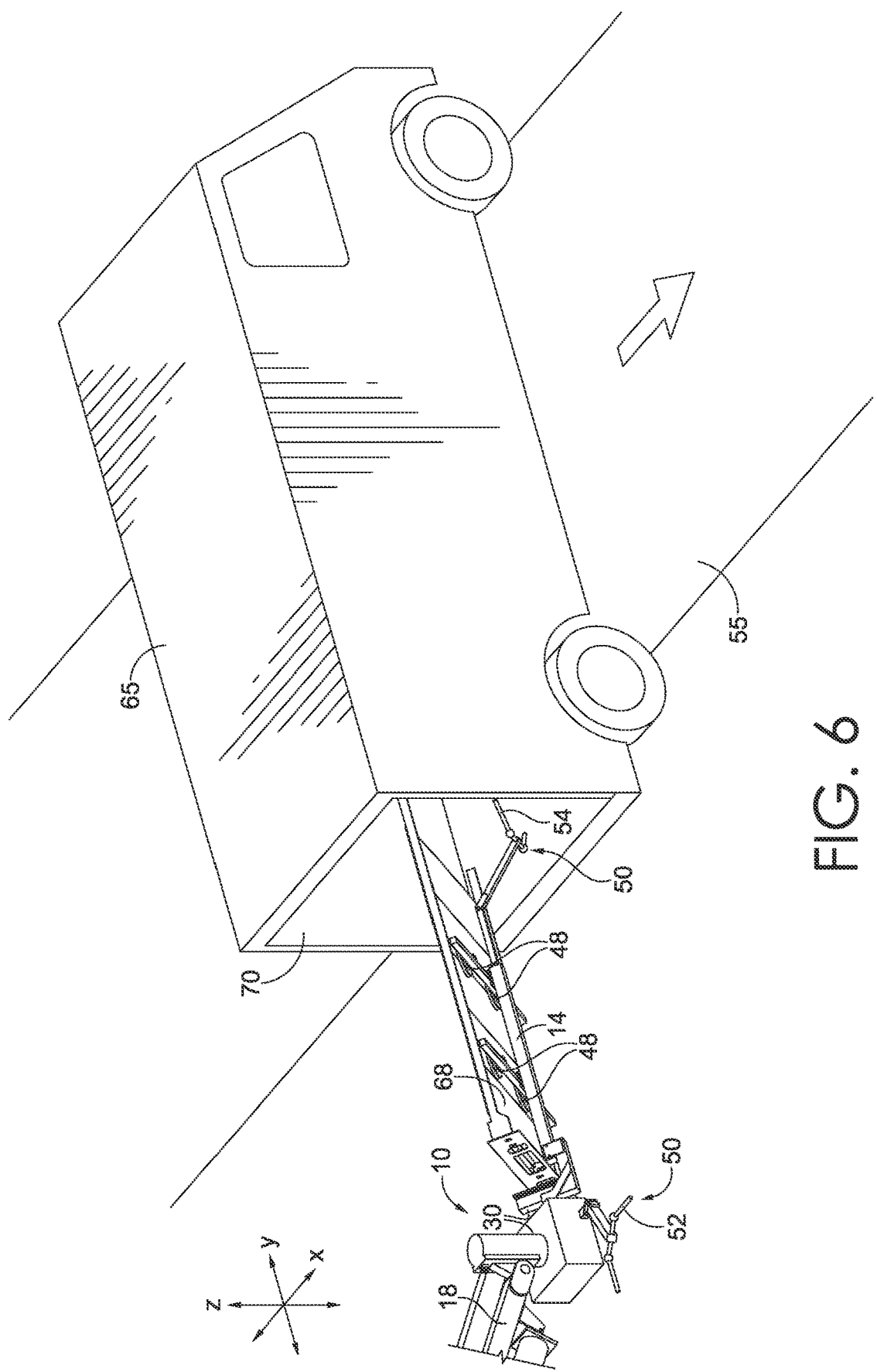
FIG. 6 depicts the object-shifting mechanism shown in FIGS. 2-4 being used to position a component in a vehicle for assembly/installation, in accordance with an embodiment of the present disclosure.

Looking at FIG. 6, the object-shifting mechanism 10 (depicted in-part for clarity and simplicity) has engaged the component 68 and is in the process of shifting the component 68 to an assembly/installation location in the vehicle 65. In FIG. 6, the component 68 is shown being held or retained against the frame 14 of the object-shifting mechanism 10. To enable this, the pickup devices 48 have been placed in contact with the component 68, and engaged/operated, to generate forces that hold the component 68 against the frame 14 during the transfer process. In FIG. 6, the pivot-connection 30 has been operated to pivot the frame 14 about the z-axis as identified in FIG. 6 and about the y-axis as identified in FIG. 6. In particular, the pivot-connection 30 has been operated to rotate the frame 14 counter-clockwise relative to the vehicle 65 in FIG. 6, to allow the frame 14 and the component 68 thereon to fit through an opening 70 into the vehicle 65. The shifting of the frame 14 with the component 68 thereon can be directed/controlled by the control system 50, e.g., using the control device 52 and/or 54.

Figure 7:
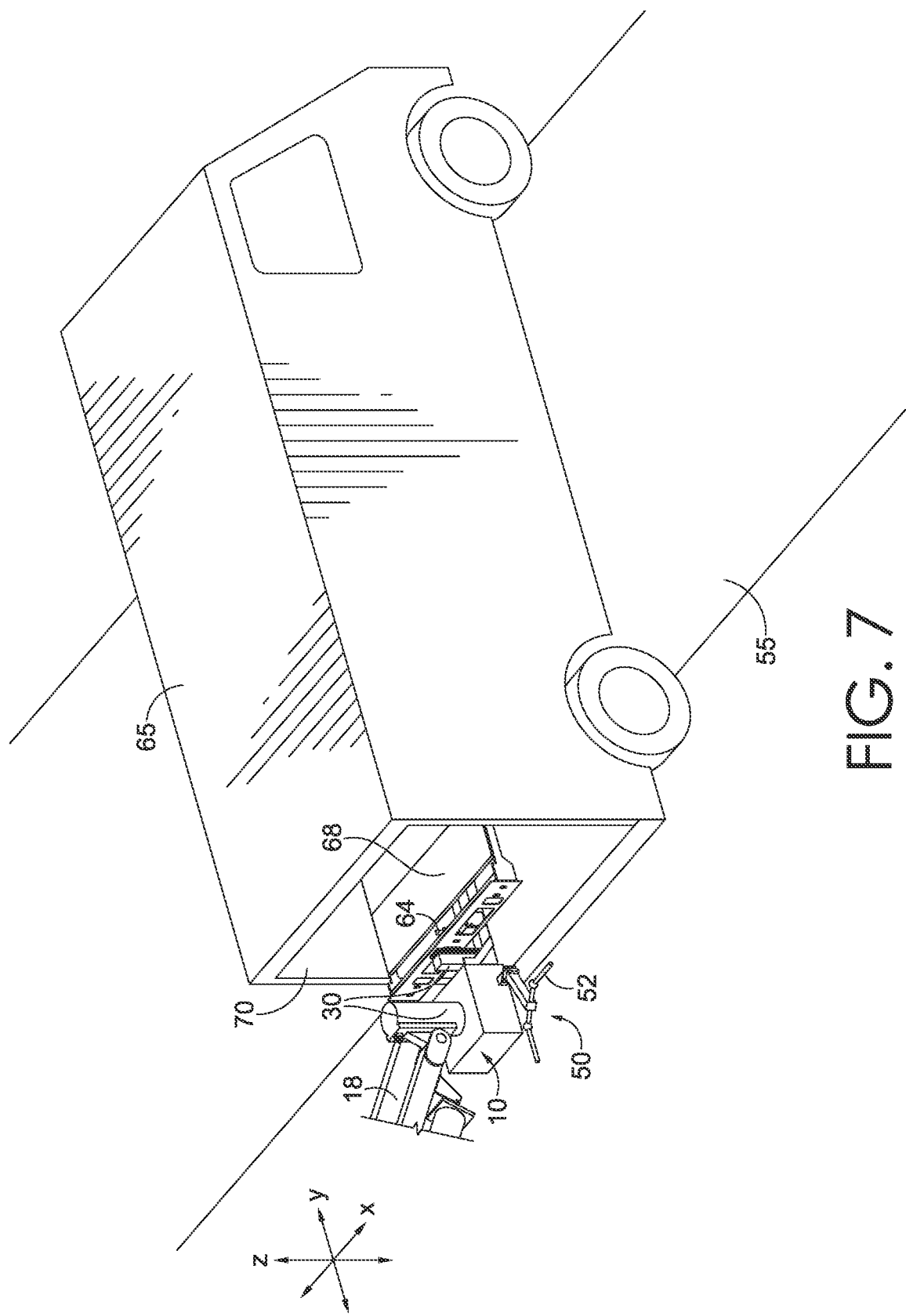
FIG. 7 depicts the object-shifting mechanism shown in FIGS. 2-4 being used to further position the component in the vehicle for assembly/installation, in accordance with an embodiment of the present disclosure.

Looking now at FIG. 7, the object-shifting mechanism 10 is shown further positioning the component 68 in the vehicle 65 for installation/assembly, in accordance with an embodiment of the present disclosure. In FIG. 7, the pivot-connection 30 has been operated to rotate the frame 14 and the attached component 68, e.g., clock-wise relative to the vehicle 65 shown in FIG. 7. In addition, the pivoting-extension 16 and the pivoting-extension 18 (shown in FIGS. 2-4) have been adjusted to substantially linearly translate the frame 14 with the component 68 thereon further into the vehicle 65, e.g., along the y-axis as identified in FIG. 7. This translation can be controlled by the control system 50 and control devices 52, 54 thereof. In one instance, the control devices 52, 54 of the control system 50 can be used to limit, restrict, or substantially lock the movement of the frame 14 in certain directions. For example, the control system 50 can be operated to enable movement only along the y-axis as indicated in FIG. 7, or to enable movement only along the z-axis as indicated in FIG. 7, or both. This restriction can be used when the component 68 is positioned at least partially inside the vehicle 65. This can facilitate stable insertion and lifting of the component 68, while limiting, reducing, and/or inhibiting translation in undesired directions that can damage a structure of the vehicle 65. FIG. 7 also depicts the object-shifting mechanism 10 being operated to lift the component 68 inside the vehicle 65, e.g., for greater proximity to an installation location.

Figure 8:
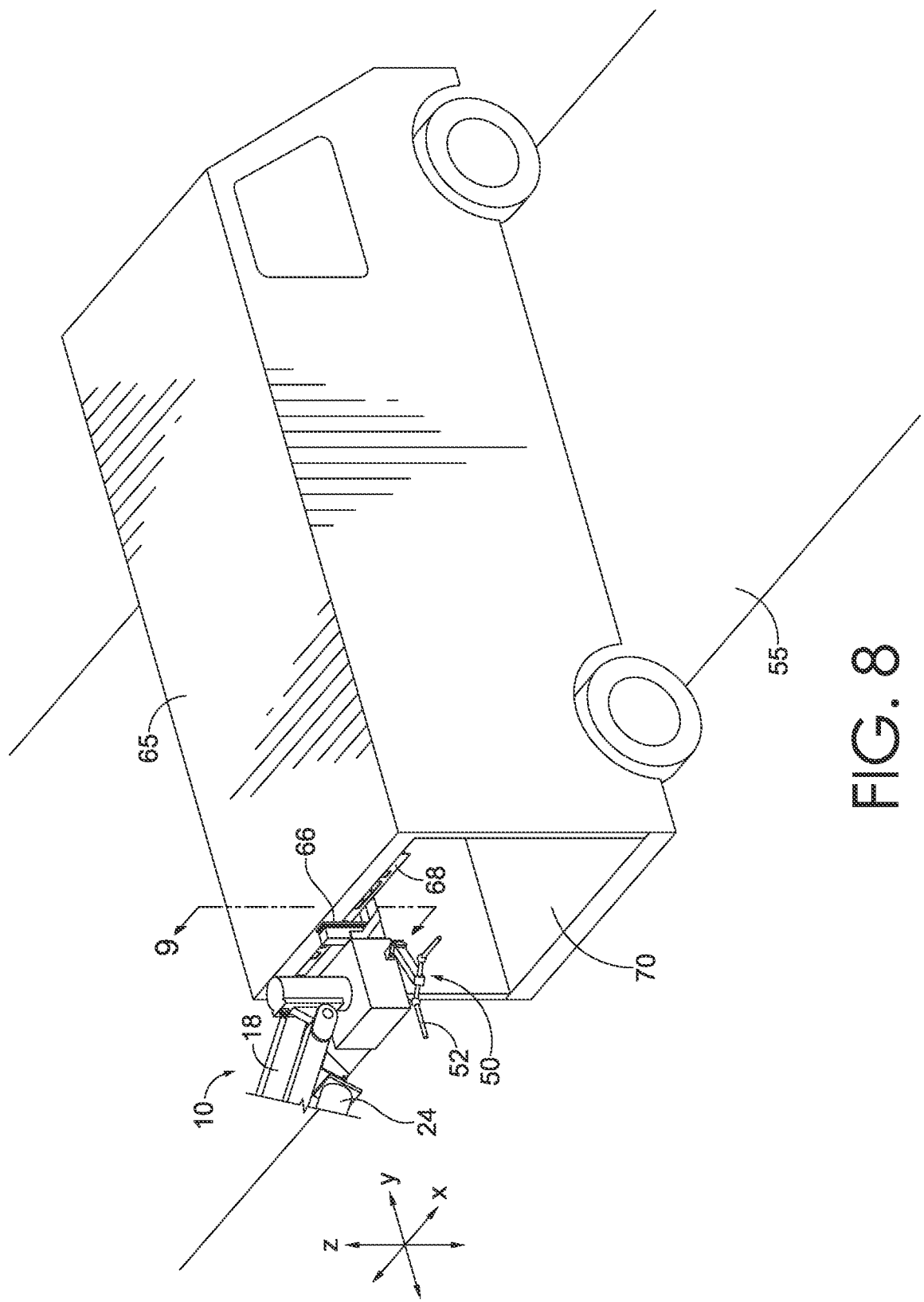
FIG. 8 depicts the object-shifting mechanism shown in FIGS. 2-4 being used to further position the component in the vehicle for assembly/installation, in accordance with an embodiment of the present disclosure.

Looking at FIG. 8, the object-shifting mechanism 10 is shown further positioning the component 68 in the vehicle 65 for installation/assembly, in accordance with an embodiment of the present disclosure. In FIG. 8, the linear actuator 24 has been operated to translate the frame 14 with the component 68 thereon from a lowered position to a raised position, e.g., adjacent to a roof or top portion of the vehicle 65 where the component 68, e.g., in this instance a roller door assembly, is to be installed. The use of the object-shifting mechanism 10 can allow the roller door assembly, which can be at least 70 kilograms in weight and thus difficult to handle manually, to be efficiently positioned, e.g., within a cycle time of three minutes or less, without requiring multiple operators to lift, hold, and attach the roller door assembly manually, thereby increasing efficiency and reducing assembly times. The object-shifting mechanism 10 can be adjusted into the depicted position shown in FIG. 8 using either the control device 52 (shown in FIG. 8) or the control device 54 (not shown in FIG. 8) and/or through coordination of separate operators using the control devices 52, 54 interchangeably. This adaptability can improve the speed, efficiency, and ease of installation during sequentially repeated assembly operations. In addition, by translating the component 68 in a fixed range of motion, and/or only along limited axes, e.g., the y-axis shown in FIG. 8 and/or the z-axis shown in FIG. 8, impact and potential damage to the vehicle 65 can be limited.

Figure 9:
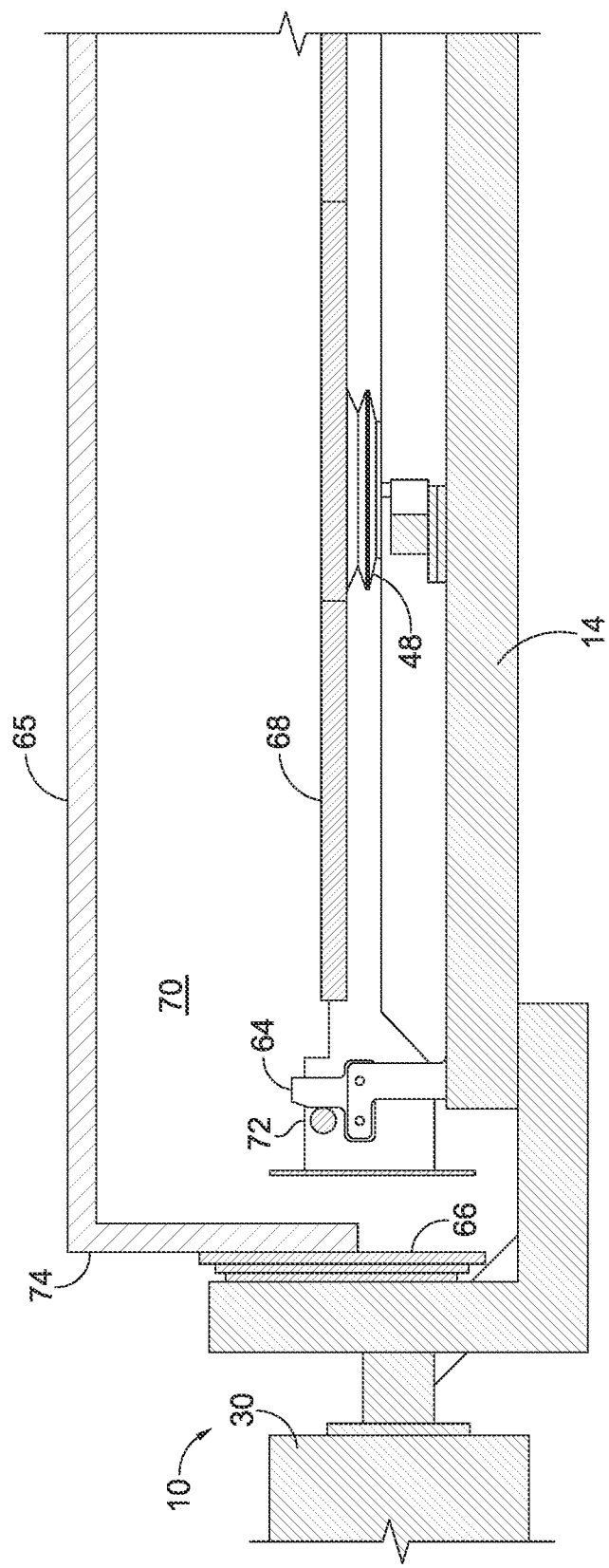
FIG. 9 depicts a cross-section of the object-shifting mechanism shown in FIG. 8 while in addition depicting alignment features including an object-locating structure and a positioning-bracket, in accordance with an embodiment of the present disclosure.

Looking at FIG. 9, a cross-section of the object-shifting mechanism 10 and the component 68 shown in FIG. 8 is provided, in accordance with an embodiment of the present disclosure. FIG. 9 generally shows part of the object-shifting mechanism 10 with the frame 14 oriented such that the component 68 is resting on a top surface of the frame 14, e.g., being supported at least partially by the pickup devices 48. FIG. 9 also depicts the locating-structure 64 of the object-shifting mechanism 10 positioned so that it is in contact with the component 68 adjacent to an end 72 of the component 68. This, as discussed above, facilitates more consistent positioning of the object-shifting mechanism 10 and the frame 14 during an assembly process. FIG. 9 also shows the positioning-bracket 66 on the object-shifting mechanism 10 being positioned in contact with an external frame 74 of the vehicle 65. In other words, the object-shifting mechanism 10 has translated the component 68 into the vehicle 65 until the positioning-bracket 66 has contacted the external frame 74. This position—determined by the location of the positioning-bracket 66 on the object-shifting mechanism 10, corresponds to a correct depth for installation of the component 68. For example, the depth of insertion can be associated with substantial alignment of attachment structures on the component 68 and attachment structures on the vehicle 65. For example, this can be alignment of apertures used for securing fasteners, e.g., screws, bolts, rivets, and the like, with corresponding holes or housings on the vehicle 65. Thus, in a particular assembly operation, the location of the positioning-bracket 66 or a similar structure on the object-shifting mechanism 10 can be selected based on a depth of insertion that is associated with proper alignment and attachment of components.

Figure 10:
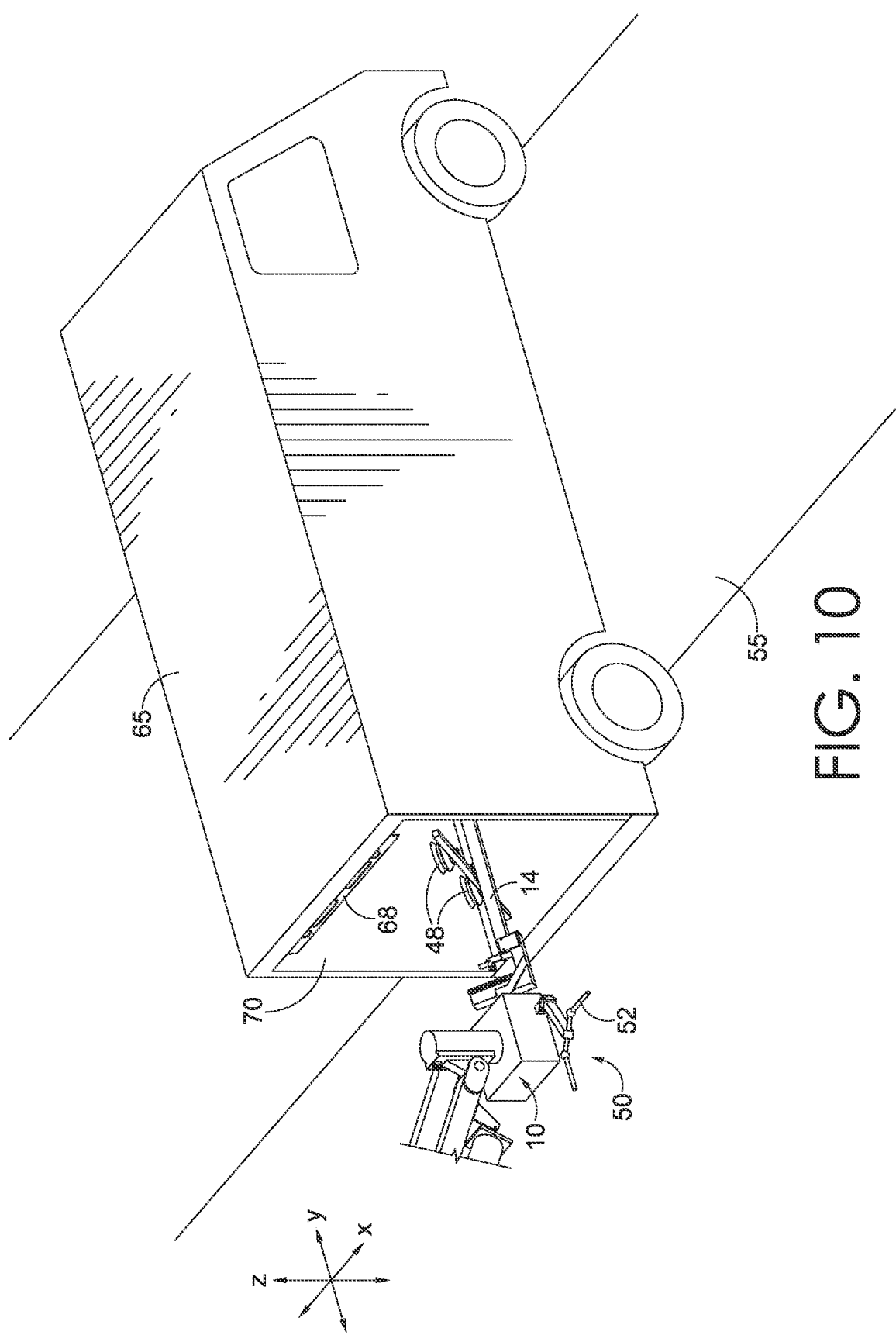
FIGS. 10 and 11 depict the object-shifting mechanism shown in FIGS. 2-4 being retracted subsequent to assembly/ installation of the component, in accordance with an embodiment of the present disclosure.

Looking at FIG. 10, the object-shifting mechanism 10 is again shown, in particular being retracted from the vehicle 65 following installation of the component 68, in accordance with an embodiment of the present disclosure. In FIG. 10, the component 68 is now attached inside the vehicle 65. Following attachment of the component 68, the object-shifting mechanism 10 can be operated to disengage, deactivate, and/or release the pickup devices 48 to decouple the object-shifting mechanism 10 from the component 68. Then, the object-shifting mechanism 10 can be rotated, e.g., either direction, e.g., counter-clockwise relative to the vehicle 65, as shown in FIG. 10. This non-horizontal orientation of the object-shifting mechanism 10 inside the vehicle 65 can help maintain a greater spacing between the object-shifting mechanism 10 and the surrounding vehicle 65 during retraction, e.g., limiting potential contact, impact, and damage to the vehicle 65. The object-shifting mechanism 10 can be retracted along the y-axis as identified in FIG. 10. In particular, the shifting of the frame 14 along the y-axis as identified in FIG. 10 can be provided by actuating components of the object-shifting mechanism 10, e.g., the pivoting-extensions 16, 18 discussed in connection with FIGS. 2-4.

Figure 11:
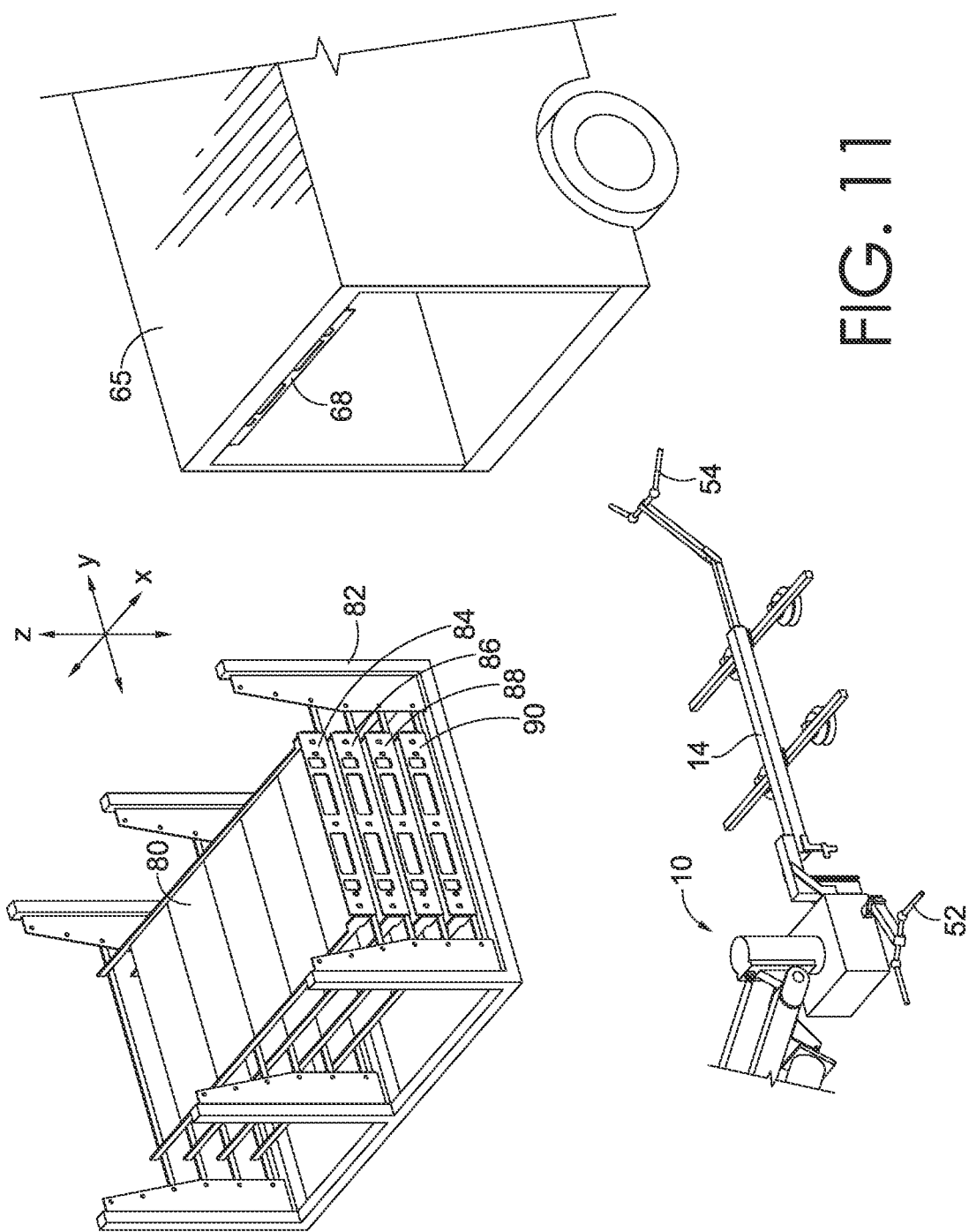

Looking now at FIG. 11, the object-shifting mechanism 10 is again shown retracted from the vehicle 65, e.g., in position for performing another assembly operation, in accordance with an embodiment of the present disclosure. In particular, the object-shifting mechanism 10 is retracted from the vehicle 65, e.g., along the y-axis, and in addition, is in position to be rotated about the z-axis towards a supply station 82. The supply station 82 holds a plurality of components 84, 86, 88, 90 in a stacked configuration. The components 84, 86, 88, 90 can be similar to the component 68 that was installed on the vehicle 65. The vehicle 65 can be advanced so that another vehicle is positioned adjacent to the object-shifting mechanism 10. Then, the object-shifting mechanism 10, once having lifted the top-positioned component 80, can position it for installation on the new vehicle. This allows the stacked components 84, 86, 88, 90 to be installed in a repeated sequence of installations in a manufacturing operation.

Looking now at FIG. 12, a generic diagram 100 of a control system 102 and connected components used in connection with a object-shifting mechanism, e.g., the object-shifting mechanism 10 shown in FIGS. 2-4, is provided, in accordance with an embodiment of the present disclosure. The control system 102 includes one or more connected computer processors 112 and one or more connected memories 108. In addition, the control system 102 is connected to a plurality of other components as shown in FIG. 12. The connections to these components can be hard-wired connections and/or wireless connections in different embodiments. The components of the diagram 100 shown in FIG. 12 can be consolidated and/or distributed, and/or can be local and/or remote to an object-shifting mechanism, e.g., such as the object-shifting mechanism 10 shown in FIGS. 2-4.

The control system 102 can control operation of different components of an object-shifting mechanism and can receive, process, and present feedback from different components of an object-shifting mechanism. For example, an electronic and/or physical input to the control system 102 can communicate a command to a component of the object-shifting mechanism resulting in operation thereof. In another example, feedback from a component of the object-shifting mechanism can be received, processed, and/or used to produce an indication, e.g., on a screen, or through an indicator, e.g., a light, signal, or character display. Example indications can be an on/off state, and/or a functional/non-functional state.

The control system 102 is connected to a first control device 104 and to a second control device 110. The use of multiple control devices, e.g., 104 and 110, can allow one or more operators to control a object-shifting mechanism from different physical locations as discussed herein. This can facilitate easier, more precise, and more efficient assembly of large objects/components, e.g., during installation in confined spaces, or where controlling a object-shifting mechanism from a single control device is otherwise difficult. The object-shifting mechanism 10 shown in FIGS. 2-4, and others contemplated herein, can include any number of such control devices, e.g., 1, 2, 3, 4, or more, positioned at any location, side, and/or orientation. The control devices can also be attached so as to have one or multiple degrees of movement to allow for adaptable positioning.

The control system 102 is also connected to one or more actuators 106 (e.g., hydraulic, electric, and/or pneumatic) that can impart motion (linear and/or rotational) to components of a object-shifting mechanism, e.g., the object-shifting mechanism 10 shown in FIGS. 2-4. In addition, the control system 102 is connected to pickup devices 114, e.g., which can be similar to the pickup devices 48 shown in FIGS. 2-4. The control system 102 can thus control engagement/disengagement of the pickup devices 114 to facilitate holding or releasing objects and components.

Looking now at FIG. 13, an example control device 120 is shown, in accordance with an embodiment of the present disclosure. The control device 120 shown in FIG. 13 can be used with the object-shifting mechanism 10 shown in FIGS. 2-4, among other similar devices. For example, the control device 120 can be used as the control device 52 and/or as the control device 54 on the object-shifting mechanism 10 shown in FIGS. 2-4. The control device 120 includes a handle 122 and a handle 124 connected by a cross-bar 125. The handles 122, 124 can be positioned at different orientations on the cross-bar 125, e.g., to facilitate efficient operation of the control device 120 during different manufacturing and assembly operations.

The control device 120 includes a series of control elements 126, 128, 130, 132, 134, 136, 138, 140, 142, 144. These control elements 126, 128, 130, 132, 134, 136, 138, 140, 142, 144 represent only one possible selection, placement, and configuration of such control elements and numerous others are contemplated herein. For example, in other embodiments, more, fewer, or different control elements can be used. In addition, similar control elements but with different or interchanged operabilities may be used in accordance with different embodiments contemplated herein. The control elements 126, 128, 130, 132, 134, 136, 138, 140, 142, 144 can be mechanically-operable (e.g., being mechanical switches, levers, or linkages) or can be electrically-operable (e.g., being electric switches, connections, or communication elements), or can be some combination of the same. The control elements 126, 128, 130, 132, 134, 136, 138, 140, 142, 144 can be used to turn-on, turn-off, actuate, de-actuate, or otherwise direct different components of a object-shifting mechanism, e.g., the object-shifting mechanism 10 shown in FIGS. 2-4, in connection with embodiments discussed herein.

The control device 120 will now be described in connection with the object-shifting mechanism 10 shown in FIGS. 2-4 for example purposes. The control device 120 includes a control element 126. In one non-limiting embodiment, the control element 126 can be configured to operate one or more actuators of the object-shifting mechanism 10, e.g., that adjust the frame 14 thereof, e.g., from a lowered position to a raised position. For example, the control element 126 may operate the linear actuator 24 of the object-shifting mechanism 10, e.g., causing it to extend and thereby raise the frame 14.

The control device 120 also includes a control element 128. In one non-limiting embodiment, the control element 128 can be configured to operate one or more actuators of the object-shifting mechanism 10, e.g., that adjust the frame 14 thereof, e.g., from a raised position to a lowered position. For example, the control element 128 may operate the linear actuator 24 of the object-shifting mechanism 10, e.g., causing it to retract and thereby lower the frame 14.

The control device 120 also includes a control element 130. The control element 130 can be one that controls a number of different functions depending on the configuration. However, in one non-limiting embodiment, the control element 130 may be configured during operation to initiate a system-stop, system-lock, or system shut-off, e.g., to inhibit or substantially prevent shifting of components of the object-shifting mechanism 10, e.g., even if control elements 126, 128, 132, 134, 136, 138, 140, 142, 144 are otherwise engaged.

The control device 120 also includes a control element 132. In one non-limiting embodiment, the control element 132 can be one that controls a start and stop setting of the object-shifting mechanism 10. For example, in this configuration, the control element 132 can be operated to turn-on or turn-off electrical, pneumatic, and/or hydraulic systems that power the object-shifting mechanism 10 and components thereof, and/or can be operated to turn-on or turn-off the other control elements 126, 128, 130, 134, 136, 138, 140, 142, and/or 144 of the control device 120 for operational use.

The control device 120 also includes a control element 134. In one non-limiting embodiment, the control element 134 can be one that is operable to activate the pickup devices 48 positioned on the frame 14 of the object-shifting mechanism 10. For example, operating the control element 134 can activate a source of vacuum, activate an electrical current, and/or shift a mechanical gripping component to thereby at least partially engage, hold, and/or retain an object, e.g., such as the component 68, e.g., during pickup, transfer, and positioning for installation and assembly.

The control device 120 also includes a control element 136. In one non-limiting embodiment, the control element 136 can be one that is operable to de-activate the pickup devices 48 positioned on the frame 14 of the object-shifting mechanism 10. For example, once an object is transferred into position by the object-shifting mechanism 10 and attached/installed, the control element 136 can be operated to release the object from the object-shifting mechanism 10, e.g., so that the object-shifting mechanism 10 can be repositioned and used for shifting another object.

The control device 120 also includes a control element 138. In one non-limiting embodiment, the control element 138 can be one that controls operation of one or more actuators that rotate the frame 14 of the object-shifting mechanism 10. For example, in one instance, the control element 138 may control rotation of the frame 14 at the pivot-point 32 of the pivot-connection 30, e.g., allowing the frame 14 to be rotated about the y-axis as identified in FIG. 2. In one aspect, the control element 138 may control such rotation in a single rotational direction, e.g., clockwise or counter-clockwise (anti-clockwise).

The control device 120 also includes a control element 140. In one non-limiting embodiment, the control element 140 can be one that controls operation of one or more actuators that rotate the frame 14 of the object-shifting mechanism 10. For example, in one instance, the control element 140 may control rotation of the frame 14 at the pivot-point 32 of the pivot-connection 30, e.g., allowing the frame 14 to be rotated about the y-axis as shown in FIG. 2. In one aspect, the control element 140 may control rotation in a single rotational direction, e.g., clockwise or counter-clockwise (anti-clockwise), with the direction of rotation being the opposite of that initiated by the control element 138.

The control device 120 also includes a control element 142. In one non-limiting embodiment, the control element 142 can be one that controls operation of one or more actuators that horizontally translate the frame 14 of the object-shifting mechanism 10. For example, the control element 142 may operate the actuators that rotate the pivoting-extension 16 and/or the pivoting-extension 18 to thereby shift the frame 14 in a substantially horizontal plane, e.g., in at least one direction. For example, this can include shifting the frame 14, e.g., when holding the component 68, towards an assembly location, e.g., such as the vehicle 65 shown in FIGS. 6-11.

The control device 120 also includes a control element 144. In one non-limiting embodiment, the control element 144 can be one that controls operation of one or more actuators that horizontally translate the frame 14 of the object-shifting mechanism 10. For example, the control element 144 may operate the actuators that rotate the pivoting-extension 16 and/or the pivoting-extension 18 to thereby shift the frame 14 in a substantially horizontal plane, e.g., in at least one direction. For example, this can include shifting the frame 14 away from an assembly location, e.g., such as the vehicle 65 shown in FIGS. 6-11. Thus, the control elements 142 and 144 may operate the actuators such that horizontal shifting occurs in substantially opposite and/or non-aligned directions.

It should be noted that the functionalities of any of the control elements 126, 128, 130, 132, 134, 136, 138, 140, 142, 144 described above can be combined into common control elements. For example, in different aspects, one control element may control the functions of both 126 and 128, and/or one control element may control the functions of both 134 and 136, and/or one control element may control the functions of both 138 and 140, and/or one control element may control the functions of both 142 and 144, thus resulting in fewer control elements but with at least some controlling a greater number of the functions through differential operation.

The control elements 126, 128, 130, 132, 134, 136, 138, 140, 142, 144 shown in FIG. 13 have been described as having particular functionalities or possible functionalities. However, this is intended to represent only one possible configuration. In different embodiments, any of the control elements 126, 128, 130, 132, 134, 136, 138, 140, 142, 144 can instead have a different functionality, e.g., any of the alternative functionalities discussed in connection with FIG. 13. In other words, each control element 126, 128, 130, 132, 134, 136, 138, 140, 142, 144 can alternatively be assigned any one of the functionalities described above. In addition, in different embodiments, additional elements with additional control functionalities can be provided with the control device 120. For example, additional control elements can be used to operate lights, sensors, cameras, audible indications, or screens/displays, among other things, may be provided.

Looking now at FIG. 14, a block diagram of an example method 1400 of positioning vehicle components, e.g., such as a roller-door assembly, for assembly using an object-shifting mechanism, e.g., such as the object-shifting mechanism 10 shown in FIGS. 2-4, is provided, in accordance with an embodiment of the present disclosure. The method 1400 includes blocks 1402-1408, but is not limited to this selection of elements. In block 1402, the method includes positioning a object-shifting mechanism, e.g., the object-shifting mechanism 10 shown in FIGS. 2-4, adjacent to a vehicle component, e.g., the component 68 shown in FIGS. 6-11. In block 1404, the method includes operating a control system, e.g., the control system 102 shown in FIG. 12, to engage one or more pickup devices, e.g., the pickup devices 48 shown in FIGS. 2-4, so that the one or more pickup devices are attached to the vehicle component. In block 1406, the method includes operating the control system to re-orient, e.g., rotate and/or linearly translate, the attached vehicle component using the object-shifting mechanism. In block 1408, the method includes operating the control system to shift, e.g., rotating, linearly translating, and/or raising or lowering, the re-oriented vehicle component into a partially assembled vehicle.

Looking now at FIG. 15, a block diagram of an example method 1500 of positioning objects for assembly using an object-shifting mechanism, e.g., such as the object-shifting mechanism 10 shown in FIG. 2, is provided, in accordance with an embodiment of the present disclosure. The method 1500 includes blocks 1502-1510, but is not limited to this selection of elements. In block 1502, the method 1500 includes shifting a frame, e.g., the frame 14 shown in FIG. 2, toward an object, e.g., the component 68 shown in FIG. 5, until a first alignment feature, e.g., the locating-structure 64 shown in FIG. 2, is in contact with the object, e.g., abutting contact. In block 1504, the method 1500 includes operating one or more pickup devices, e.g., the pickup devices 48 shown in FIG. 2, so that the one or more pickup devices engage and hold the object against the frame, e.g., as shown in an example in FIG. 5. In block 1506, the method 1500 includes shifting the frame and the object held against the frame from a first location, e.g., as shown in FIG. 5, toward a second location, e.g., as shown in FIG. 8. In block 1508, the method 1500 includes shifting the frame and the object held against the frame until a second alignment feature, e.g., the positioning-bracket 66 shown in FIG. 2, is in contact with a partially assembled structure, e.g., the vehicle 65 shown in FIG. 8, at the second location. In block 1510, the method 1500 includes attaching the object to the partially assembled structure at the second location, e.g., through use of fasteners, mechanical attachments, welding, bonding, or through another attachment method. In addition, before or after attachment, the object may be decoupled from the frame of the object-shifting mechanism.

FIG. 16 depicts a block diagram of a method 1600 of positioning objects for assembly using an object-shifting mechanism, e.g., the object-shifting mechanism 10 shown in FIG. 2, in accordance with an embodiment of the present disclosure. The method 1600 includes blocks 1602-1610, but is not limited to this selection of elements. In block 1602, the method 1600 includes operating at least a first control device, e.g., the control device 52 or 54 shown in FIG. 2, to shift a frame, e.g., the frame 14 shown in FIG. 2, toward an object, e.g., the component 68 shown in FIG. 5, until a first alignment feature, e.g., the locating-structure 64 shown in FIG. 2, contacts the object. In block 1604, the method 1600 includes operating at least the first control device to engage one or more pickup devices, e.g., the pickup devices 48 shown in FIG. 2, so that the one or more pickup devices hold the object against the frame. In block 1606, the method 1600 includes operating the first control device and/or a second control device, e.g., the other of the control device 52 or 54 shown in FIG. 2, to shift the frame and the object held against the frame from a first location, e.g., as shown in FIG. 5, toward a second location, e.g., as shown in FIG. 8. In block 1608, the method 1600 includes operating at least the second control device to shift the frame and the object held against the frame until a second alignment feature, e.g., the positioning-bracket 66 shown in FIG. 2, contacts a partially assembled structure, e.g., the vehicle 65 shown in FIG. 8, at the second location. In block 1610, the method 1600 includes attaching the object to the partially assembled structure at the second location, e.g., using any of the attachment methods described herein, e.g., before or after the object is detached and/or decoupled from the object-shifting mechanism.

Clause 1. A lift-assist mechanism comprising a frame with one or more pickup devices; an actuator assembly coupled to the frame; and a control system operable to engage and disengage the one or more pickup devices, and shift the frame to a plurality of different positions and orientations using the actuator assembly.

Clause 2. The lift-assist mechanism of clause 1, further comprising a base; a first pivoting-extension rotatably coupled to the base and extending to a first distal end; and a second pivoting-extension rotatably coupled to the first distal end, the second pivoting-extension extending to a second distal end that is rotatably coupled to the frame.

Clause 3. The lift-assist mechanism of clause 1 or 2, wherein the second distal end is coupled to the frame through a pivot-connection, wherein the pivot-connection is oriented so that the frame can rotate about an axis extending axially through the pivot-connection.

Clause 4. The lift-assist mechanism of any of clauses 1-3, wherein the actuator assembly comprises a first rotational actuator coupled to the first pivoting-extension and operable to rotate the first pivoting-extension on the base; a second rotational actuator coupled to the second pivoting-extension and operable to rotate the second pivoting-extension on the first distal end; a third rotational actuator coupled to the pivot-connection and operable to rotate the frame on the pivot-connection; and a linear actuator coupled to the second pivoting-extension and operable to shift the second distal end between a lowered position and a raised position Clause 5. The lift-assist mechanism of any of clauses 1-4, wherein the frame comprises a first end and a second end, wherein the one or more pickup devices are mounted on the frame between the first end and the second end, and wherein the control system comprises a first control device coupled to the first end of the frame and a second control device coupled to the second end of the frame.

Clause 6. The lift-assist mechanism of any of clauses 1-5, wherein the first control device is attached to the frame with a first movable-extension that allows the first control device to adjust to different positions relative to the frame, and wherein the second control device is attached to the frame with a second movable-extension that allows the second control device to adjust to different positions relative to the frame.

Clause 7. The lift-assist mechanism of any of clauses 1-6, wherein the control system includes at least one control device that comprises a first control element operable to pivot the frame about a first point of rotation; a second control element operable to pivot the frame about a second point of rotation; a third control element operable to pivot the frame about a third point of rotation; a fourth control element operable to shift the frame between a lowered position and a raised position; and a fifth control element operable to engage and disengage the one or more pickup devices.

Clause 8. The lift-assist mechanism of any of clauses 1-7, wherein each pickup device comprises a suction cup; an electromagnet; or a vacuum-suction head.

Clause 9. The lift-assist mechanism of any of clauses 1-8, further comprising an object-locating structure, wherein the object-locating structure is mounted adjacent to a perimeter of the frame.

Clause 10. The lift-assist mechanism of any of clauses 1-9, further comprising a positioning-bracket, wherein the positioning-bracket is mounted between the actuator assembly and the frame.

Clause 11. The lift-assist mechanism of any of clauses 1-10, wherein the frame, the actuator assembly, and the one or more pickup devices are adapted to hold a structure that is at least 70 kilograms.

Clause 12. A method of positioning vehicle components for assembly using a lift-assist mechanism, the method comprising positioning the lift-assist mechanism adjacent to a vehicle component, the lift-assist mechanism comprising a frame with one or more pickup devices; an actuator assembly coupled to the frame; and a control system operable to engage and disengage the one or more pickup devices, and shift the frame to a plurality of different positions and orientations using the actuator assembly; operating the control system to engage the one or more pickup devices so that the one or more pickup devices are attached to the vehicle component; operating the control system to re-orient the attached vehicle component using the lift-assist mechanism; and operating the control system to shift the re-oriented vehicle component into a partially assembled vehicle.

Clause 13. The method of clause 12, wherein the vehicle component comprises a roller-door.

Clause 14. The method of clause 12 or 13, wherein the roller-door is at least 70 kilograms.

Clause 15. The method of any of clauses 12-14, further comprising, prior to operating the control system to engage the one or more pickup devices so that the one or more pickup devices are attached to the vehicle component, operating the control system to shift the lift-assist mechanism until an object-locating structure mounted on the lift-assist mechanism contacts the vehicle component.

Clause 16. The method of any of clauses 12-15, wherein re-orienting the vehicle component comprises rotating the vehicle component to a non-horizontal orientation prior to shifting the re-oriented vehicle component into the partially assembled vehicle.

Clause 17. The method of any of clauses 12-16, wherein shifting the re-oriented vehicle component into the partially assembled vehicle comprises inserting the vehicle component into the partially assembled vehicle at the non-horizontal orientation using the lift-assist mechanism; re-orienting the vehicle component to a substantially horizontal orientation using the lift-assist mechanism while the vehicle component is at least partially inside the partially assembled vehicle, and lifting the vehicle component from a lowered position to a raised position inside the partially assembled vehicle using the lift-assist mechanism.

Clause 18. The method of any of clauses 12-17, further comprising operating the control system to lock the lift-assist mechanism in a fixed orientation.

Clause 19. The method of any of clauses 12-18, wherein shifting the re-oriented vehicle component into the partially assembled vehicle using the lift-assist mechanism comprises shifting the vehicle component until a positioning-bracket mounted on the lift-assist mechanism contacts the partially assembled vehicle.

Clause 20. A control system for a lift-assist mechanism, comprising a first control device that attaches to the lift-assist mechanism; and a second control device that attaches to the lift-assist mechanism, wherein the first control device and the second control device are each operable to engage and disengage one or more pickup devices on the lift-assist mechanism, and shift the lift-assist mechanism to a plurality of different positions and orientations.

Clause 21. A method of assembling and/or manufacturing the lift-assist mechanism of any of the preceding clauses 1-20.

Clause 22. A method of positioning objects for assembly using an object-shifting mechanism comprising a frame, one or more pickup devices, a first alignment feature, and a second alignment feature, the method comprising shifting the frame toward an object until the first alignment feature is in contact with the object; operating the one or more pickup devices so that the one or more pickup devices engage and hold the object against the frame; shifting the frame and the object held against the frame from a first location toward a second location; shifting the frame and the object held against the frame until the second alignment feature is in contact with a partially assembled structure at the second location; and attaching the object to the partially assembled structure at the second location.

Clause 23. The method of clause 22, wherein the object comprises a vehicle component, wherein the partially assembled structure comprises a partially assembled vehicle, and wherein the vehicle component is shifted through an opening into the partially assembled vehicle.

Clause 24. The method of clause 22 or 23, wherein the vehicle component is a roller-door assembly.

Clause 25. The method of any of clauses 22-24, wherein the first alignment feature comprises a locating-structure that extends away from the frame, and wherein the second alignment feature comprises a positioning-bracket that is attached to a pivot-connection located at one end of the frame.

Clause 26. The method of any of clauses 22-25, wherein the locating-structure and the one or more pickup devices are spaced-apart on the object-shifting mechanism such that when the locating-structure is shifted into contact with a side of the roller-door assembly, the one or more pickup devices are positioned over a surface of the roller-door assembly to be engaged.

Clause 27. The method of any of clauses 22-26, further comprising determining that the first alignment feature and the object are in contact based on a signal from a first sensor that is attached to the first alignment feature; and determining that the second alignment feature and the partially assembled structure are in contact based on a signal from a second sensor that is attached to the second alignment feature.

Clause 28. The method of any of clauses 22-27, wherein the object-shifting mechanism comprises a first control device that is movably coupled to a first end of the frame and a second control device that is movably coupled to a second end of the frame, wherein at least the first control device is used to shift the first alignment feature into contact with the object, and wherein at least the second control device is used to shift the second alignment feature into contact with the partially assembled structure.

Clause 29. The method of any of clauses 22-28, wherein shifting the frame toward the second location comprises rotating the frame and the object into a first orientation; shifting the frame and the object through an opening in the partially assembled structure in the first orientation; rotating the frame and the object into a second orientation; lifting the frame and the object from a lowered position to a raised position inside the partially assembled structure; and shifting the frame and the object until the second alignment feature is in contact with an external frame around the opening.

Clause 30. The method of any of clauses 22-29, wherein the first alignment feature comprises a lower degree of hardness than the object that is contacted by the first alignment feature, and wherein the second alignment feature comprises a lower degree of hardness than the partially assembled structure that is contacted by the second alignment feature.

Clause 31. The method of any of clauses 22-30, wherein each pickup device comprises a suction cup; an electromagnet; or a vacuum-suction head.

Clause 32. A method of positioning objects for assembly using an object-shifting mechanism comprising a frame, one or more pickup devices, a first control device coupled to the frame, a second control device coupled to the frame, a first alignment feature, and a second alignment feature, the method comprising operating at least the first control device to shift the frame toward an object until the first alignment feature contacts the object; operating at least the first control device to engage the one or more pickup devices so that the one or more pickup devices hold the object against the frame; operating the first control device and/or the second control device to shift the frame and the object held against the frame from a first location toward a second location; operating at least the second control device to shift the frame and the object held against the frame until the second alignment feature contacts a partially assembled structure at the second location; and attaching the object to the partially assembled structure at the second location.

Clause 33. The method of clause 32, wherein the object comprises a vehicle component, wherein the partially assembled structure comprises a partially assembled vehicle, and wherein the vehicle component is shifted through an opening into the partially assembled vehicle.

Clause 34. The method of clause 32 or 33, wherein the vehicle component is a roller-door assembly.

Clause 35. The method of any of clauses 32-34, wherein the first alignment feature comprises a locating-structure that extends away from the frame, and wherein the second alignment feature comprises a positioning-bracket that is attached to a pivot-connection located at one end of the frame.

Clause 36. The method of any of clauses 32-35, wherein the locating-structure and the one or more pickup devices are spaced-apart on the object-shifting mechanism such that when the locating-structure is shifted into contact with a side of the roller-door assembly, the one or more pickup devices are positioned over a surface of the roller-door assembly to be engaged.

Clause 37. The method of any of clauses 32-36, further comprising determining that the first alignment feature and the object are in contact based on a signal from a first sensor that is attached to the first alignment feature; and determining that the second alignment feature and the partially assembled structure are in contact based on a signal from a second sensor that is attached to the second alignment feature.

Clause 38. The method of any of clauses 32-37, wherein the first control device is movably coupled to a first end of the frame such that the first control device is adjustable to different positions relative to the frame, and wherein the second control device is movably coupled to a second end of the frame such that the second control device is adjustable to different positions relative to the frame.

Clause 39. The method of any of clauses 32-38, further comprising adjusting a position of the first control device relative to the frame during shifting of the frame and the object, and adjusting a position of the second control device relative to the frame during shifting of the frame and the object.

Clause 40. A system for shifting objects into position for assembly inside a partially assembled structure, the system comprising an actuator assembly; a frame coupled to the actuator assembly and movable to a plurality of different positions using the actuator assembly; one or more pickup devices attached to the frame; a first control device coupled to the frame at a first location, the first control device operable to shift the frame using the actuator assembly, and the first control device adjustable into different positions relative to the frame; and a second control device coupled to the frame at a second location, the second control device operable to shift the frame using the actuator assembly, and the second control device adjustable into different positions relative to the frame.

Clause 41. The system of clause 40, further comprising a first alignment feature attached to the frame such that it extends away from the frame; and a second alignment feature attached to the actuator assembly such that it is spaced from the frame.

Clause 42. The elements of preceding clauses 1-41 in any combination.

In some embodiments, this disclosure may include the language, for example, "at least one of [element A] and [element B]." This language may refer to one or more of the elements. For example, "at least one of A and B" may refer to "A," "B," or "A and B." In other words, "at least one of A and B" may refer to "at least one of A and at least one of B," or "at least either of A or B." In some embodiments, this disclosure may include the language, for example, "[element A], [element B], and/or [element C]." This language may refer to either of the elements or any combination thereof. In other words, "A, B, and/or C" may refer to "A," "B," "C," "A and B," "A and C," "B and C," or "A, B, and C." In addition, this disclosure may use the term "and/or" which may refer to any one or combination of the associated elements.

The subject matter of this disclosure has been described in relation to particular embodiments, which are intended in all respects to be illustrative rather than restrictive. In this sense, alternative embodiments will become apparent to those of ordinary skill in the art to which the present subject matter pertains without departing from the scope hereof. In addition, different combinations and sub-combinations of elements disclosed, as well as use and inclusion of elements not shown, are possible and contemplated as well.

What is claimed is:

1. A method of positioning objects for assembly using an object-shifting mechanism comprising a frame, one or more pickup devices, a first alignment feature, and a second alignment feature, the method comprising:
    shifting the frame toward an object until the first alignment feature is in contact with the object;
    operating the one or more pickup devices so that the one or more pickup devices engage and hold the object against the frame;
    shifting the frame and the object held against the frame from a first location toward a second location;
    shifting the frame and the object held against the frame until the second alignment feature is in contact with a partially assembled structure at the second location; and
    attaching the object to the partially assembled structure at the second location,
    wherein the object-shifting mechanism comprises a first control device that is movably coupled to a first end of the frame and a second control device that is movably coupled to a second end of the frame, wherein at least the first control device is used to shift the first alignment feature into contact with the object, and wherein at least the second control device is used to shift the second alignment feature into contact with the partially assembled structure.

2. The method of claim 1, wherein the object comprises a vehicle component, wherein the partially assembled structure comprises a partially assembled vehicle, and wherein the vehicle component is shifted through an opening in the partially assembled vehicle.

3. The method of claim 2, wherein the vehicle component is a roller-door assembly.

4. The method of claim 3, wherein the first alignment feature comprises a locating-structure that extends away from the frame, and wherein the second alignment feature comprises a positioning-bracket that is attached to a pivot-connection located at one end of the frame.

5. The method of claim 4, wherein the locating-structure and the one or more pickup devices are spaced-apart on the object-shifting mechanism such that when the locating-structure is shifted into contact with a side of the roller-door assembly, the one or more pickup devices are positioned over a surface of the roller-door assembly to be engaged.

6. The method of claim 1, further comprising:
    determining that the first alignment feature and the object are in contact based on a signal from a first sensor that is attached to the first alignment feature; and
    determining that the second alignment feature and the partially assembled structure are in contact based on a signal from a second sensor that is attached to the second alignment feature.

7. The method of claim 1, wherein the first alignment feature comprises a lower degree of hardness than the object that is contacted by the first alignment feature, and wherein the second alignment feature comprises a lower degree of hardness than the partially assembled structure that is contacted by the second alignment feature.

8. The method of claim 1, wherein each pickup device comprises:
    a suction cup;
    an electromagnet; or
    a vacuum-suction head.

9. A method of positioning objects for assembly using an object-shifting mechanism comprising a frame, one or more pickup devices, a first alignment feature, and a second alignment feature, the method comprising:
    shifting the frame toward an object until the first alignment feature is in contact with the object;
    operating the one or more pickup devices so that the one or more pickup devices engage and hold the object against the frame;
    shifting the frame and the object held against the frame from a first location toward a second location;
    shifting the frame and the object held against the frame until the second alignment feature is in contact with a partially assembled structure at the second location, wherein shifting the frame toward the second location comprises:
        rotating the frame and the object into a first orientation;
        shifting the frame and the object through an opening in the partially assembled structure in the first orientation;
        rotating the frame and the object into a second orientation;
        lifting the frame and the object from a lowered position to a raised position inside the partially assembled structure; and
        shifting the frame and the object until the second alignment feature is in contact with an external frame around the opening; and
    attaching the object to the partially assembled structure at the second location.

10. The method of claim 9, wherein the first alignment feature comprises a locating-structure that extends away from the frame, and wherein the second alignment feature comprises a positioning-bracket that is attached to a pivot-connection located at one end of the frame.

11. The method of claim 10, wherein the locating-structure and the one or more pickup devices are spaced-apart on the object-shifting mechanism such that when the locating-structure is shifted into contact with a side of the object, the one or more pickup devices are positioned over a surface of the object to be engaged.

12. A method of positioning objects for assembly using an object-shifting mechanism comprising a frame, one or more pickup devices, a first control device coupled to the frame, a second control device coupled to the frame, a first alignment feature, and a second alignment feature, the method comprising:

operating at least the first control device to shift the frame toward an object until the first alignment feature contacts the object;

operating at least the first control device to engage the one or more pickup devices so that the one or more pickup devices hold the object against the frame;

operating the first control device and/or the second control device to shift the frame and the object held against the frame from a first location toward a second location;

operating at least the second control device to shift the frame and the object held against the frame until the second alignment feature contacts a partially assembled structure at the second location; and attaching the object to the partially assembled structure at the second location.

13. The method of claim 12, wherein the object comprises a vehicle component, wherein the partially assembled structure comprises a partially assembled vehicle, and wherein the vehicle component is shifted through an opening in the partially assembled vehicle.

14. The method of claim 13, wherein the vehicle component is a roller-door assembly.

15. The method of claim 14, wherein the first alignment feature comprises a locating-structure that extends away from the frame, and wherein the second alignment feature comprises a positioning-bracket that is attached to a pivot-connection located at one end of the frame.

16. The method of claim 15, wherein the locating-structure and the one or more pickup devices are spaced-apart on the object-shifting mechanism such that when the locating-structure is shifted into contact with a side of the roller-door assembly, the one or more pickup devices are positioned over a surface of the roller-door assembly to be engaged.

17. The method of claim 12, further comprising:

determining that the first alignment feature and the object are in contact based on a signal from a first sensor that is attached to the first alignment feature; and determining that the second alignment feature and the partially assembled structure are in contact based on a signal from a second sensor that is attached to the second alignment feature.

18. The method of claim 12, wherein the first control device is movably coupled to a first end of the frame such that the first control device is adjustable to different positions relative to the frame, and wherein the second control device is movably coupled to a second end of the frame such that the second control device is adjustable to different positions relative to the frame.

19. The method of claim 18, further comprising:

adjusting a position of the first control device relative to the frame during shifting of the frame and the object, and adjusting a position of the second control device relative to the frame during shifting of the frame and the object.

\* \* \* \* \*